United States Patent
Hampel et al.

(10) Patent No.: US 10,484,879 B2
(45) Date of Patent: Nov. 19, 2019

(54) SYNCHRONIZED COMMUNICATION ACROSS WIRELESS COMMUNICATION SPECTRUM

(71) Applicant: QUALCOMM Incorporated, San Diego, CA (US)

(72) Inventors: Karl Georg Hampel, Hoboken, NJ (US); Chong Li, Weehawken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/927,801

(22) Filed: Mar. 21, 2018

(65) Prior Publication Data

US 2018/0288623 A1 Oct. 4, 2018

Related U.S. Application Data

(60) Provisional application No. 62/477,897, filed on Mar. 28, 2017.

(51) Int. Cl.
*H04W 16/14* (2009.01)
*H04W 72/04* (2009.01)
*H04W 74/08* (2009.01)

(52) U.S. Cl.
CPC ....... *H04W 16/14* (2013.01); *H04W 72/0446* (2013.01); *H04W 74/0808* (2013.01)

(58) Field of Classification Search
None
See application file for complete search history.

(56) References Cited

U.S. PATENT DOCUMENTS

| 9,913,297 | B2* | 3/2018 | Ahn | H04L 1/0025 |
| 2007/0178840 | A1* | 8/2007 | Deguchi | H04W 88/10 455/62 |
| 2011/0243278 | A1* | 10/2011 | Cheng | H03M 13/136 375/340 |
| 2011/0269474 | A1* | 11/2011 | Parkvall | H04L 5/0053 455/445 |
| 2013/0155991 | A1* | 6/2013 | Kazmi | H04W 72/0453 370/329 |
| 2014/0362780 | A1* | 12/2014 | Malladi | H04W 16/14 370/329 |
| 2015/0237626 | A1* | 8/2015 | Li | H04L 5/00 370/280 |
| 2015/0264702 | A1 | 9/2015 | Yang et al. | |

(Continued)

OTHER PUBLICATIONS

International Search Report and Written Opinion—PCT/US2018/023878—ISA/EPO—dated Jun. 20, 2018.

*Primary Examiner* — Otis L Thompson, Jr.
(74) *Attorney, Agent, or Firm* — Loza & Loza LLP

(57) ABSTRACT

Various aspects of the disclosure relate to wireless communication that is synchronized across different wireless communication spectrum. For example, communication on an unlicensed spectrum may, in response to a particular trigger, switch to a licensed spectrum. Here, the switch may occur in a time synchronized manner (e.g., according to a frame structure). In addition, communication across such spectrum may be synchronized among multiple systems. For example, a controller may specify a reuse pattern to be used by the different systems for communication across unlicensed spectrum and licensed spectrum.

28 Claims, 16 Drawing Sheets

(56) References Cited

U.S. PATENT DOCUMENTS

| | | | |
|---|---|---|---|
| 2015/0334599 A1 | 11/2015 | Maaref et al. | |
| 2015/0382347 A1* | 12/2015 | Cheng | H04W 24/08 |
| | | | 370/329 |
| 2017/0078997 A1 | 3/2017 | Dinan | |
| 2017/0105207 A1* | 4/2017 | Fan | H04W 16/14 |
| 2017/0202018 A1* | 7/2017 | Cha | H04W 74/0816 |
| 2017/0231013 A1* | 8/2017 | Ahn | H04W 74/0883 |
| 2017/0279565 A1* | 9/2017 | Han | H04L 1/1877 |
| 2018/0176953 A1* | 6/2018 | Hampel | H04W 16/14 |
| 2018/0206235 A1* | 7/2018 | Zhu | H04W 28/08 |
| 2018/0343589 A1* | 11/2018 | Li | H04W 74/08 |
| 2019/0053222 A1* | 2/2019 | Bhorkar | H04W 16/14 |

* cited by examiner

SYNCHRONIZED COMMUNICATION ACROSS WIRELESS COMMUNICATION SPECTRUM

CROSS-REFERENCE TO RELATED APPLICATION(S)

This application claims priority to and the benefit of provisional patent application No. 62/477,897 filed in the U.S. Patent and Trademark Office on Mar. 28, 2017, the entire content of which is incorporated herein by reference.

INTRODUCTION

Various aspects described herein relate to wireless communication and, more particularly, but not exclusively, to communication that is synchronized across different wireless communication spectrum.

Wireless communication networks are widely deployed to provide various communication services such as telephony, video, data, messaging, broadcasts, and so on. Such networks, which are usually multiple access networks, support communication for multiple users by sharing the available network resources.

In some wireless communication networks, different sets (e.g., groups) of co-located wireless communication devices may communicate simultaneously. Consequently, transmissions by a wireless communication device of one set may interfere with reception at a wireless communication device of another set. Thus, there is a need for effective techniques to mitigate interference between sets of wireless communication devices.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a method of communication including: sending information on a first radio frequency (RF) spectrum; receiving a trigger to switch to a second RF spectrum; as a result of receiving the trigger, waiting for an allocated time to commence sending on the second RF spectrum; and sending additional information on the second RF spectrum at the allocated time.

One aspect of the disclosure provides an apparatus for communication, including: a memory and a processor coupled to the memory. The processor and the memory are configured to: send information on a first radio frequency (RF) spectrum; receive a trigger to switch to a second RF spectrum; as a result of receiving the trigger, wait for an allocated time to commence sending on the second RF spectrum; and send additional information on the second RF spectrum at the allocated time.

One aspect of the disclosure provides an apparatus configured for communication. The apparatus including: means for sending information on a first radio frequency (RF) spectrum; means for receiving a trigger to switch to a second RF spectrum; means for waiting for an allocated time to commence sending on the second RF spectrum as a result of receiving the trigger; and means for sending additional information on the second RF spectrum at the allocated time. The means for sending information and the means sending additional information may be implemented as a single means for sending or as separate means for sending (e.g., a first means for sending and a second means for sending).

One aspect of the disclosure provides a non-transitory computer-readable medium storing computer-executable code, including code to: send information on a first radio frequency (RF) spectrum; receive a trigger to switch to a second RF spectrum; as a result of receiving the trigger, wait for an allocated time to commence sending on the second RF spectrum; and send additional information on the second RF spectrum at the allocated time.

One aspect of the disclosure provides a method of communication including: allocating a first set of devices to use a first subset of frames in a first RF spectrum and a second subset of frames in a second RF spectrum; allocating a second set of devices to use a second subset of frames in the first RF spectrum and a first subset of frames in the second RF spectrum; defining at least one frame structure based on the allocation of the first set of devices and the allocation of second set of devices; and sending an indication of the at least one frame structure.

One aspect of the disclosure provides an apparatus for communication, including: a memory and a processor coupled to the memory. The processor and the memory are configured to: allocate a first set of devices to use a first subset of frames in a first RF spectrum and a second subset of frames in a second RF spectrum; allocate a second set of devices to use a second subset of frames in the first RF spectrum and a first subset of frames in the second RF spectrum; define at least one frame structure based on the allocation of the first set of devices and the allocation of second set of devices; and send an indication of the at least one frame structure.

One aspect of the disclosure provides an apparatus configured for communication. The apparatus including: means for allocating a first set of devices to use a first subset of frames in a first RF spectrum and a second subset of frames in a second RF spectrum; means for allocating a second set of devices to use a second subset of frames in the first RF spectrum and a first subset of frames in the second RF spectrum; means for defining at least one frame structure based on the allocation of the first set of devices and the allocation of second set of devices; and means for sending an indication of the at least one frame structure.

One aspect of the disclosure provides a non-transitory computer-readable medium storing computer-executable code, including code to: allocate a first set of devices to use a first subset of frames in a first RF spectrum and a second subset of frames in a second RF spectrum; allocate a second set of devices to use a second subset of frames in the first RF spectrum and a first subset of frames in the second RF spectrum; define at least one frame structure based on the allocation of the first set of devices and the allocation of second set of devices; and send an indication of the at least one frame structure.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
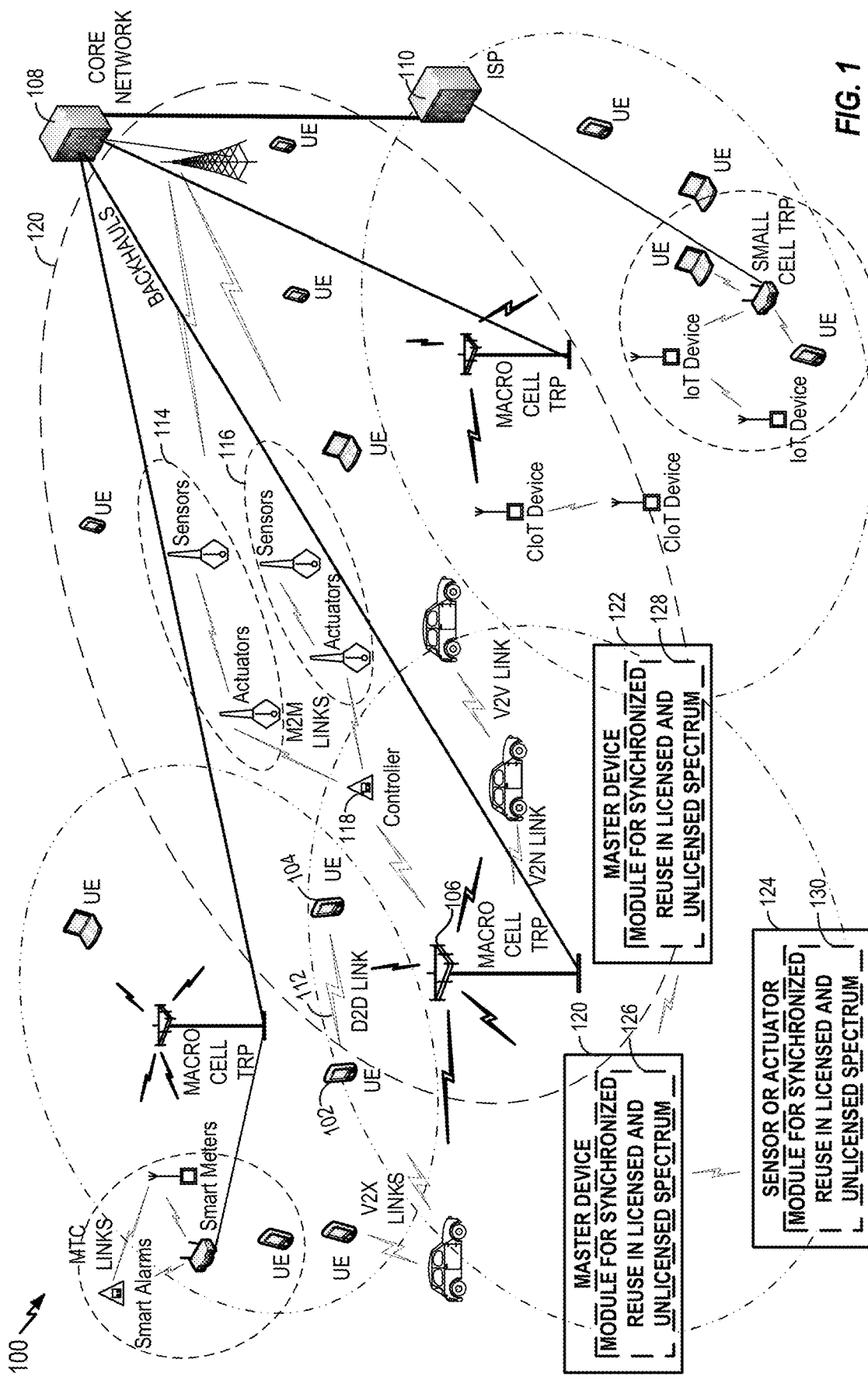
FIG. 1 is a diagram of an example communication system in which aspects of the disclosure may be used.

Various aspects of the disclosure relate to wireless communication that is synchronized across different wireless communication spectrum. For example, communication on an unlicensed spectrum may, in response to a particular trigger, switch to a licensed spectrum. Here, the switch may occur in a time synchronized manner (e.g., according to a frame structure). In addition, communication across such spectrum may be synchronized among multiple systems. For example, a controller may specify a reuse pattern to be used by the different systems for communication across unlicensed spectrum and licensed spectrum.

In some aspects, a frame structure may allocate time slots for clear channel assessment (CCA) to be conducted by all master devices in a wireless communication system before the master devices are allowed to transmit in a designated unlicensed spectrum. If a master device determines that the channel for the unlicensed spectrum is clear, the master device is free to transmit in the designated unlicensed spectrum frame. If a master device determines that the channel for the unlicensed spectrum is busy, the master device instead transmits in a designated licensed spectrum frame. In some aspects, this may address regulatory Listen-Before-Talk or Listen-Before-Task (LBT) requirements in the unlicensed spectrum, while minimizing use of the licensed spectrum.

In some aspects, the frame structure may allocate a time slot for ACK/NACK feedback received by all master devices after a transmission (e.g., a downlink transmission) in an unlicensed spectrum. When the feedback is a NACK, the system performs a retransmission in a licensed spectrum frame. In some aspects, this may increase reliability (e.g., in the presence of other system interference in the licensed spectrum).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102 and a second UE 104 may communicate with a transmit receive point (TRP) 106 using wireless communication resources managed by the TRP 106 and/or other network components (e.g., a core network 108, an internet service provider (ISP) 110, and so on). In addition, the UEs 102 and 104 may communicate with each other directedly via a device-to-device (D2D) link 112.

Other components of the wireless communication system 100 may communicate via D2D links or other types of links. For example, a first sub-system 114 of sensors and actuators within the wireless communication system 100 may communicate via machine-to-machine (M2M) communication or some other suitable form of communication. The wireless communication system 100 may include a second sub-system 116 of sensors and actuators or other types of sub-systems that communicate via a similar form of communication as the first sub-system 114. The sub-systems 114 and 116 may be controlled at least in some aspects by at least one controller 118 (e.g., a master device). In some situations, different sub-systems may be relatively close to one another and thereby interfere with each other.

In accordance with the teachings herein, sub-systems and associated controllers may incorporate functionality to avoid interference. For example, a first master device 120 may initially use an unlicensed spectrum. In the event there is interference on that spectrum, the first master device 120 may switch to an licensed spectrum. To further mitigate interference between the sub-systems, the first master device 120 may schedule the sub-systems on the different spectrum according to a synchronized frame structure. In some aspects, this frame structure may specify reuse patterns in the time domain and/or in the frequency domain. For example, the first master device 120 and a second master device 122 (e.g., for another sub-system) may synchronize with one another and use a schedule that specifies a staggered reuse pattern between a licensed spectrum and an unlicensed spectrum. In this way, communication between the first master device 120 and at least one associated sensor or actuator 124 will be less likely to interfere with communication between the second master device 122 and its associated sensors or actuators (not shown).

To this end, some of the devices of FIG. 1 (e.g., each of the devices in the sub-systems 114 and 116, the controller 118, and any other master devices and sensors or actuators) may include functionality for controlling the resources used by the devices for communication in the system 100 (e.g., via D2D links). For example, as shown in FIG. 1, the first master device 120 includes a module for synchronized reuse in licensed spectrum and unlicensed spectrum 126, the second master device 122 includes a module for synchronized reuse in licensed spectrum and unlicensed spectrum 128, and the sensor or actuator 124 includes a module for synchronized reuse in licensed spectrum and unlicensed spectrum 130. Other devices in the wireless communication system 100 may include similar functionality (not shown).

As used herein, the term spectrum (i.e., RF spectrum) includes spectrum that may be contiguous in some cases and non-contiguous in other cases. For example, unlicensed spectrum may include one contiguous unlicensed band or two or more non-contiguous unlicensed bands. Similarly, licensed spectrum may include one contiguous licensed band or two or more non-contiguous licensed bands. As used herein, the term licensed spectrum refers to spectrum where access to the spectrum is licensed by a regulatory body (e.g., the Federal Communications Commission) or some other entity. Examples of licensed spectrum include spectrum used by cellular devices (e.g., the Cellular Service band). Examples of unlicensed spectrum include spectrum used by Wi-Fi devices (e.g., the Industrial, Scientific, and Medical (ISM) radio band and the Unlicensed National Information Infrastructure (UNII) band).

The components and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, M2M links, MTC links, vehicle-to-vehicle (V2V) links, and vehicle-to-anything (V2X) links. Network-to-device links may include, without limitation, uplinks (or reverse links), downlinks (or forward links), and vehicle-to-network (V2N) links.

Example Communication Components

Figure 2:
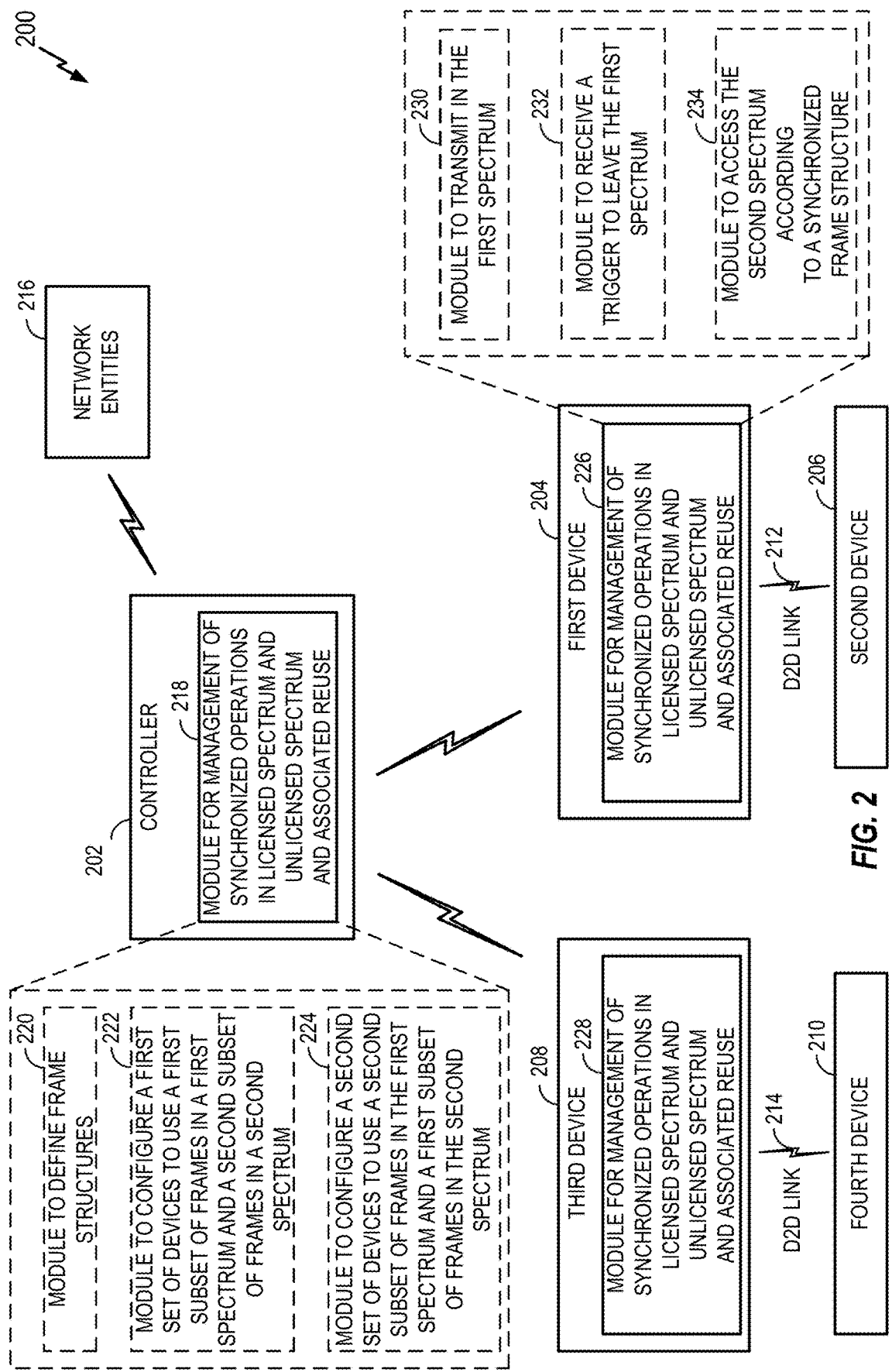
FIG. 2 is a block diagram of another example communication system in which aspects of the disclosure may be used.

FIG. 2 illustrates another example of a wireless communication system 200 where a controller (e.g., a master device) 202 controls one or more wireless communication sub-systems. For example, a first sub-system may include a first device 204 and a second device 206, while a second sub-system may include a third device 208 and a fourth device 210. The devices of each sub-system may communicate with each other via direct links or some other suitable communication link. For example, the first device 204 and the second device 206 may communicate via a first D2D link 212, while the third device 208 and the fourth device 210 may communicate via a second D2D link 214.

The devices of the wireless communication system 200 may access other communication devices of a wide area network (e.g., via network entities 216) or access communication devices in other networks (not shown). To reduce the complexity of FIG. 2, only a single controller and four devices are shown. In practice, a wireless communication system may include more of these devices. In addition, some or all of the functionality of the controller 202 may be incorporated into the first device 204 and/or the third device. In some implementations, the controller 202 may correspond to the controller 118, the first master device 120, the second master device 122, or some other device of FIG. 1. The first and second devices 204 and 206 may correspond to the first sub-system 114, the sensor or actuator 124, or some other device of FIG. 1. The third and fourth devices 208 and 210 may correspond to the second sub-system 116 or some other device of FIG. 1.

Communication on the first and second links 212 and 214 may use unlicensed spectrum and/or licensed spectrum. The use of these wireless communication resources may be managed in some aspects by the controller 202 (e.g., in a gNB or some other device). For example, the controller 202 may allocate resources for D2D links in a licensed spectrum. In some implementations (e.g., 5G NR), the D2D links may be referred to as sidelinks. In addition, the controller 202 may specify the resources in an unlicensed spectrum that can be used by the devices controlled by the controller 202.

Accordingly, the controller 202 may include a module for management of synchronized operations in licensed spectrum and unlicensed spectrum and associated reuse 218. In some aspects, this may involve defining a reuse pattern to be used by the devices controlled by the controller 202. As discussed in more detail below, the module for management of synchronized operations in licensed spectrum and unlicensed spectrum and associated reuse 218 may thus include: a module to define frame structures 220, a module to configure a first set of devices to use a first subset of frames in a first spectrum (e.g., an unlicensed spectrum) and a second subset of frames in a second spectrum 222 (e.g., a licensed spectrum), and a module to configure a second set of devices to use a second subset of frames in the first spectrum and a first subset of frames in the second spectrum 224.

The first and third devices 204 and 208 also include modules for management of synchronized operations in licensed spectrum and unlicensed spectrum and associated reuse 226 and 228, respectively. In some aspects, this may involve communicating on a first spectrum and a second spectrum according to a reuse pattern defined by the controller 202. As discussed in more detail below, the module for management of synchronized operations in licensed spectrum and unlicensed spectrum and associated reuse 226 may thus include: a module to transmit in the first spectrum 230, a module to receive a trigger to leave the first spectrum 232, and a module to access the second spectrum according to a synchronized frame structure (e.g., according to a reuse mapping). The module for management of synchronized operations in licensed spectrum and unlicensed spectrum and associated reuse 228 may include similar functionality (not shown) as the module for management of synchronized operations in licensed spectrum and unlicensed spectrum and associated reuse 226 discussed above. Also, other devices of the wireless communication system 200 (e.g., the second device 206 and the fourth device 210) may include similar functionality (not shown).

Example URLLC Operation

Communication applications, such as those used in factory automation, may apply cyclic transactions between a master device and a set of sensors and/or actuators (S/As) or between other types of devices. Several of these systems may run simultaneously and in close vicinity to each other. Consequently, to meet performance requirements, a frequency reuse of less than 1 (e.g., a reuse of 1:4) may be used to minimize inter-system interference.

Figure 3:
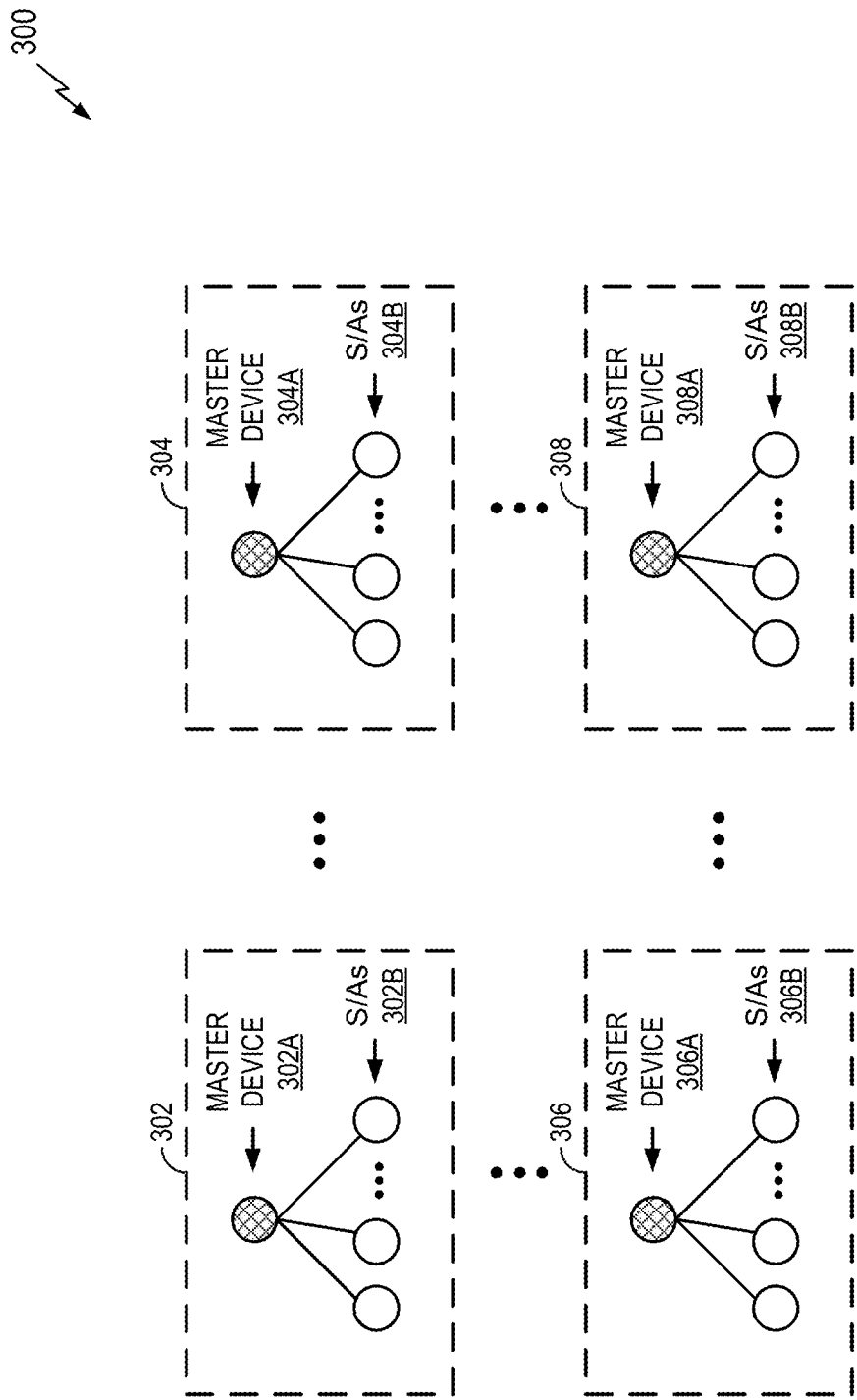
FIG. 3 is a diagram of an example ultra-reliable low-latency communication (URLLC) system.

FIG. 3 illustrates an example of a communication system 300 that includes several relatively small wireless communication systems (represented by, e.g., a first system 302, a second system 304, a third system 306, a fourth system 308, and associated ellipses). Each system consists of a master device and a set of sensors/actuators (S/As) in this example. For example, the first system 302 includes a master device 302A and S/As 302B, the second system 304 includes a master device 304A and S/As 304B, and so on. As a specific example, a robotic control device may receive information from various sensor devices and use that information to decide how or when to perform various tasks (e.g., by controlling actuator devices). Wireless communication links may be used to send information between these devices. Other configurations using other types of devices, a different number of devices, or other topologies are also possible. For example, communication may involve a set of leaf nodes deployed in a star topology.

Applications such as these may have relatively strict latency requirements or other communication performance requirements. For example, a machine may require immediate feedback from its sensors and require that the actuators perform their designated tasks with extreme timing precision. Accordingly, these systems may be ultra-reliable low-latency communication (URLLC) systems or some other suitable system type.

The systems may be in relatively close proximity. For example, a large number of systems including master devices and S/As may be deployed in a factory hall or some other setting. Continuing with the above example, different machines in a factory could be run by difference robotic control devices, each with a set of sensor devices and/or actuator devices. There could be many such machines in the factory and these machines may be relatively close to one other. Systems such as these (e.g., other URLLC systems) could be used in other applications as well.

Operation of the above applications in an unlicensed spectrum may be relatively cost-effective. However, interference from other systems (e.g., other factory systems) may be detrimental to communication (e.g., URLLC) performance. Furthermore, LBT procedures may be called for in the unlicensed spectrum. These procedures may specify that the system is to back off when a channel is occupied. This back-off may be detrimental to system (e.g., URLLC) performance. For example, if a channel is busy, the time it takes for the channel to clear may exceed the maximum latency time.

Operating in licensed spectrum can overcome these shortcomings. However, licensed spectrum operation comes at a relatively high cost and, preferably, would only be used when operation in the unlicensed spectrum fails.

It is thus desirable to coordinate the operation of URLLC systems or other systems to enable cost-effective unlicensed spectrum and licensed spectrum utilization together with a spectrally efficient frequency reuse. This coordination should be applicable, for example, to a factory or other setting where different systems operate in relatively close proximity.

Example Frame Structure

Figure 4:
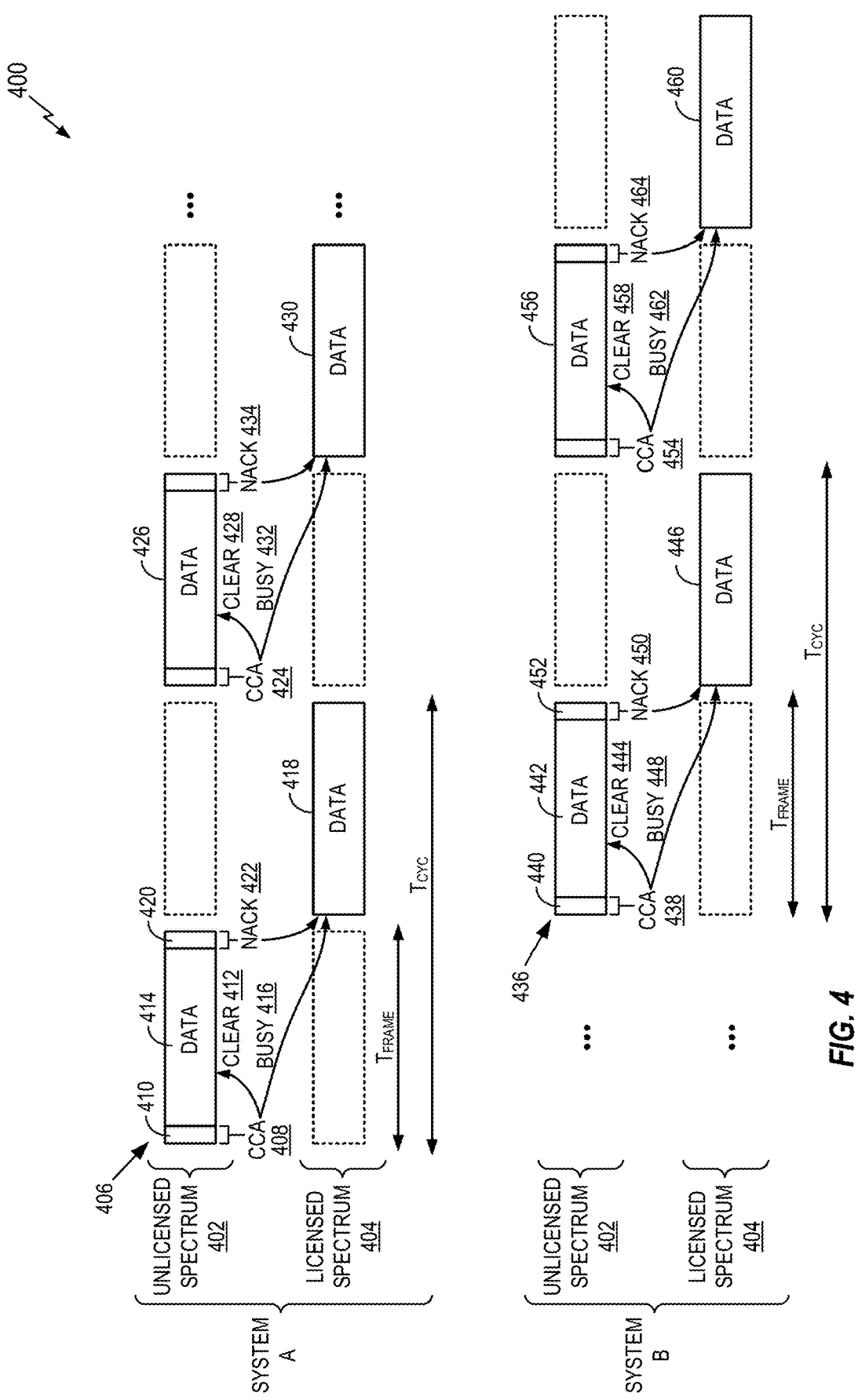
FIG. 4 is a diagram illustrating an example frame structure in accordance with some aspects of the disclosure.

FIG. 4 illustrates an example of a frame structure 400 that may be used by systems (e.g., URLLC systems) that are relatively close to one another (e.g., close enough to interfere with one another). The example of FIG. 4 shows frame allocations for two systems: a System A and a System B. A different number of systems could be used in different implementations.

Each system alternates between operation in a unlicensed spectrum 402 and a licensed spectrum 404 in response to a trigger. Switching from the unlicensed spectrum 402 to the licensed spectrum 404 is based on clear channel assessment (CCA) and/or ACK/NACK feedback integrated into the frame structure 400 via dedicated slots. Initially, the System A will be discussed.

In the first cycle (with a cycle time $T_{CYC}$) shown for System A, a transmitting device initially operates in the unlicensed spectrum 402 during a frame 406 (with a frame time $T_{FRAME}$). At the beginning of the frame 406, the transmitting device performs a CCA 408 during a slot 410. If the CCA 408 indicates that the channel is clear 412, the transmitting device transmits data during the data slots 414 of the frame 406. If the CCA 408 indicates that the channel is busy 416, the transmitting device waits for the next available frame 418 in the licensed spectrum 404, and commences transmission during the frame 418.

If the transmitting device transmitted data during the data slots 414 of the frame 406 in the unlicensed spectrum 402, the transmitting device may receive acknowledgment information in a slot 420 of the frame. For example, a receiver that received the frame could send a positive acknowledgement (ACK) if the data was received successfully or a negative acknowledgement (NACK) if the data was not received successfully (e.g., due to poor channel conditions). If the transmitting device receives a NACK 422, the transmitting device waits for the next available frame 418 in the licensed spectrum 404, and commences transmission during the frame 418.

The System A may then perform similar operations during subsequent cycles. For example, based on a CCA 424, the transmitting device transmits data during a frame 426 in the unlicensed spectrum 402 if the channel is clear 428 or waits to transmit the data in a frame 430 in the licensed spectrum 404 if the channel is busy 432. In addition, if the transmitting device receives a NACK 434, the transmitting device may retransmit the data in the frame 430 in the licensed spectrum 404.

The transmitting devices and receiving devices discussed above may take different forms in different implementations. In some cases, these devices may take the form of a master device and one or more peripherals to the master device (e.g., sensor devices, actuator devices, or other types of devices). The devices could also be or be incorporated into a base station and/or associated user equipment (UE) devices. Other examples of devices are possible.

In some cases, all of the devices in a system could include the functionality of the transmitting device and the receiving device discussed above. To support this, the frame structure could specify resources (e.g., slots and/or spectrum) for communication in two separate directions (e.g., uplink and downlink).

Use of the unlicensed spectrum and the licensed spectrum may be coordinated among systems to increase the reuse factor and thereby improve spectral efficiency. For example, as shown in FIG. 4, the System A (e.g., a first subset of the master devices) is configured to use a first subset of frames (e.g., the frames 406 and 426) for unlicensed spectrum transmission and a second subset of frames (e.g., the frames 418 and 430) for licensed spectrum transmission. As discussed below, the System B (e.g., a second subset of the master devices) is configured to use the first subset of frames for licensed spectrum transmission and the second subset of frames for unlicensed spectrum transmission. Thus, the reuse in this case applies a "flipped" spectrum selection. This coordination of unlicensed and licensed operation across systems may thus improve reuse by a factor of 2.

Referring now to the System B, during a first cycle, a transmitting device may initially operate in the unlicensed spectrum 402 during a frame 436 that occurs during the same timeslot as the licensed spectrum frame 418 used by the System A. Similar to the procedure of System A, the transmitting device may initially perform a CCA 438 during a slot 440 and transmit data during the data slots 442 of the frame 436 in the unlicensed spectrum 402 if the channel is clear 444 or wait for the next available frame 446 in the licensed spectrum 404 if the channel is busy 448. Also, if the transmitting device transmitted data during the data slots 442 of the frame 436 in the unlicensed spectrum 402 and received a NACK 450 during a slot 452, the transmitting device may wait for the next available frame 446 in the licensed spectrum 404, and then commence transmission during the frame 446.

The System B may then perform similar operations during subsequent cycles. For example, based on a CCA 454, the transmitting device transmits data during a frame 456 in the unlicensed spectrum 402 if the channel is clear 458 or waits to transmit the data in a frame 460 in the licensed spectrum 404 if the channel is busy 462. In addition, if the transmitting device receives a NACK 464, the transmitting device may retransmit the data in the frame 460 in the licensed spectrum 404.

In the example of FIG. 4, the cycle time $T_{CYC}$ (e.g., a URLLC cycle time) corresponds to two frame times ($2 \times T_{FRAME}$). The cycle time could be different in other implementations (e.g., communication systems that include more than two URLLC systems).

In some aspects, all master devices may be time-synchronized via an over-the-air (OTA) signal to a frame structure used for communication (e.g., URLLC) in the licensed spectrum and in the unlicensed spectrum. This enables time division multiplexing (TDM) across all of the systems (e.g., all URLLC system in a particular campus).

The above approach may provide a good trade-off between using the unlicensed spectrum as much as possible, while still meeting any performance requirements. For example, a transmitting device might switch to the licensed spectrum only when the unlicensed spectrum does not provide the required level of service (e.g., when the unlicensed spectrum is busy or traffic on the unlicensed spectrum has a high error rate).

Various types of triggers (spectrum switching criteria) may be used to trigger a switch from the unlicensed spectrum to the license spectrum. For example, depending on current performance requirements, a transmitting device could perform multiple CCA (or LBT) operations before deciding to switch to the licensed spectrum. As another example, depending on current performance requirements, a transmitting device could perform multiple hybrid automatic repeat request (HARQ) operations before deciding to switch to the licensed spectrum. Also, a transmitting device could perform these operations on different channels of the unlicensed spectrum before deciding to switch to the licensed spectrum. Furthermore, operations other than CCA, LBT, ACK/NACK, HARQ, etc., could be used.

A CCA or other suitable procedure may be performed by different devices in different implementations. In some cases, the CCA might only be performed by a master device. For example, the transmit power of the S/As may be lower than the minimum transmit power specified by a regulatory body as requiring use of a CCA operations. In other cases (e.g., when all devices have relatively high transmit power), all of the devices may perform CCA and switch to licensed spectrum when applicable.

Also, frame structures other than the one depicted in FIG. 4 could be used. For example, two or more consecutive frames could be allocated in the unlicensed spectrum and/or in the licensed spectrum, rather than just one frame as shown. Thus, for example, a transmitting device may need to wait two or more frames (optionally performing two or more CCAs and/or processing two or more ACK/NACKs) before the licensed spectrum becomes available for use. Other multiplexing approaches could also be used to share each spectrum among multiple systems within each frame in accordance with the teachings herein.

Example Reuse Pattern

Figure 5:
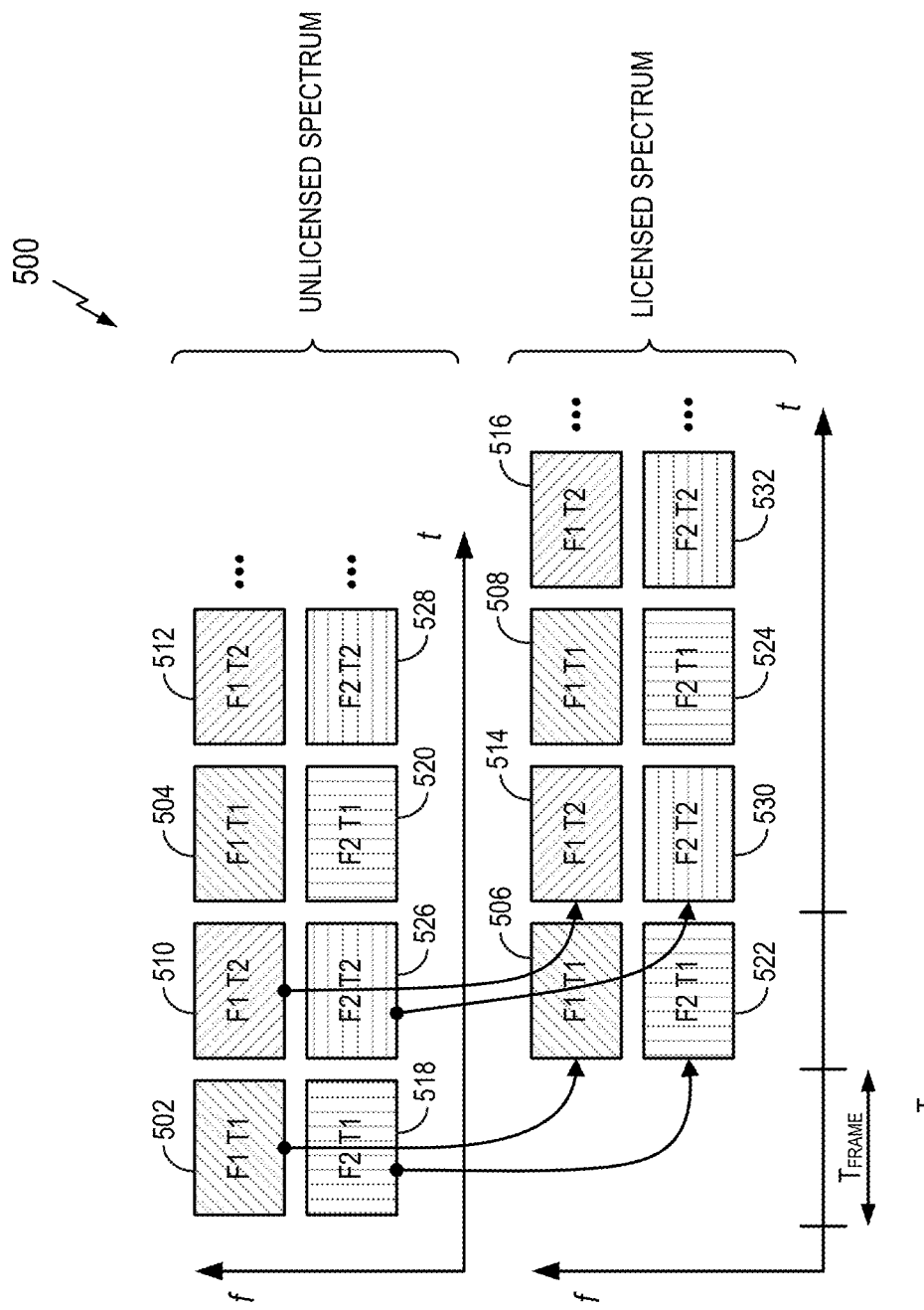
FIG. 5 is a diagram of an example reuse pattern in accordance with some aspects of the disclosure.

FIG. 5 illustrates an example of a time-frequency resource allocation 500 with a reuse factor of 1:4. This reuse is realized via a reuse of 1:2 in the frequency domain and a reuse of 1:2 in the time domain by appropriately coordinating use of unlicensed spectrum and licensed spectrum frames among systems. For example, a first system (e.g., a first URLLC system) could be allocated time-frequency resources 502 and 504 in the unlicensed spectrum and time-frequency resources 506 and 508 in the licensed spectrum. These resources are designed as F1 T1. A second system (e.g., a second URLLC system) could be allocated time-frequency resources 510 and 512 in the unlicensed spectrum and time-frequency resources 514 and 516 in the licensed spectrum (designed as F1 T2). A third system (e.g., a third URLLC system) could be allocated time-frequency resources 518 and 520 in the unlicensed spectrum and time-frequency resources 522 and 524 in the licensed spectrum (designed as F2 T1). A fourth system (e.g., a fourth URLLC system) could be allocated time-frequency resources 526 and 528 in the unlicensed spectrum and time-frequency resources 530 and 532 in the licensed spectrum (designed as F2 T2). Other reuse configurations (patterns) could be used depending on system requirements.

Example Synchronization

The frame structure used by the devices in a system may be based on a time base (e.g., a reference signal). As discussed above, a synchronization signal upon which the frame structure is based may be sent OTA. For example, a controller, a network entity (e.g., a TRP), or some other suitable entity may broadcast a synchronization signal to the master devices and the S/As in a system. As another example, the master devices and the S/As in a system may receiving a synchronization signal from another source (e.g., GPS signals received via a GPS receiver or directly from satellites).

Example Configuration Information

A controller, a network entity (e.g., a gNB), or some other suitable entity may send configuration information to the devices of a network. For example, a configuring device may determine the frame structure to be used and send an indication of the frame structure to the devices in the system either directly or indirectly. As an example of the latter case, the frame structure may be provided to the S/As via a master device. As discussed herein, the frame structure may specify when particular devices (e.g., master devices) are to use particular frames in the unlicensed spectrum and the licensed spectrum.

A configuration may define, for example, a sub-band of the unlicensed spectrum and/or the licensed spectrum to be used. The sub-band may represent, for example, a block in the spectrum or a pattern of subcarriers spread over the entire bandwidth.

Example Operations

Figure 6:
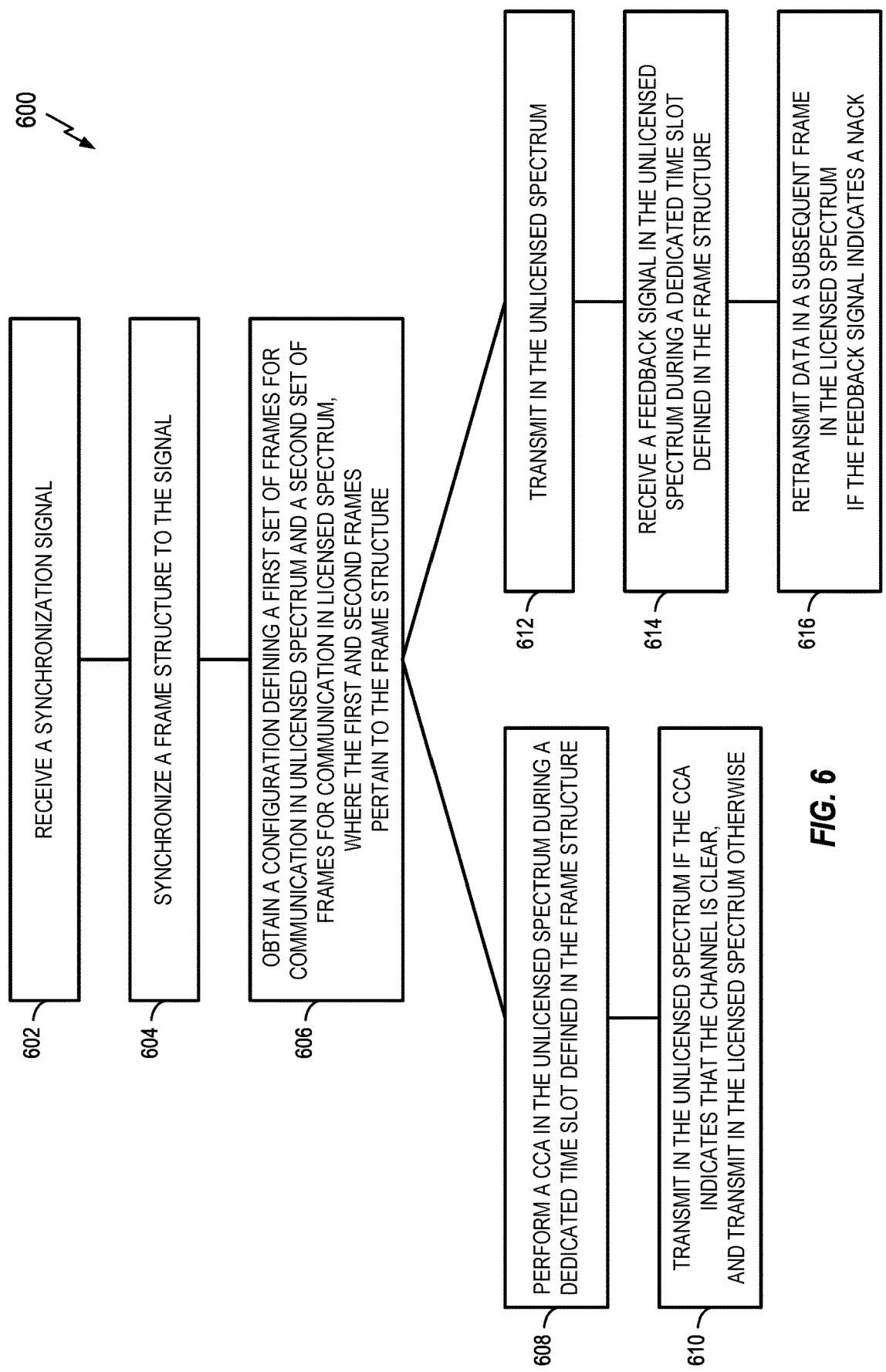
FIG. 6 is a flowchart illustrating an example of a process for communication in licensed spectrum and unlicensed spectrum in accordance with some aspects of the disclosure.

FIG. 6 illustrates a process 600 for using an unlicensed spectrum and a licensed spectrum for wireless communication in accordance with some aspects of the disclosure. The process 600 may take place within a processing circuit (e.g., the processing circuit 1010 of FIG. 10), which may be located in a master device, a controller, a UE, an access terminal, a gNB, a base station, or some other suitable apparatus. Of course, in various aspects within the scope of the disclosure, the process 600 may be implemented by any suitable apparatus capable of supporting communication-related operations (e.g., sidelink operations).

At block 602, an apparatus (e.g., a master device) receives a synchronization signal.

At block 604, the apparatus synchronizes a frame structure to the signal.

At block 606, the apparatus obtains a configuration defining a first set of frames for the communication in unlicensed spectrum and a second set of frames for the communication in licensed spectrum, where the first and second frames pertain to the frame structure.

Blocks 608 and 610 correspond to a potential first branch of operations. At block 608, the apparatus performs a CCA in the unlicensed spectrum during a dedicated time slot defined in the frame structure. At block 610, the apparatus transmits in the unlicensed spectrum if the CCA indicates that the channel is clear or transmits in the licensed spectrum if the CCA indicates that the channel is not clear.

Blocks 612-616 correspond to a potential second branch of operations. At block 612, the apparatus transmits in the unlicensed spectrum. In some scenarios this may involve CCA as discussed at blocks 608 and 610. At block 614, the apparatus receives a feedback signal in the unlicensed spectrum during a dedicated time slot defined in the frame structure. At block 616, the apparatus retransmits data in a subsequent frame in the licensed spectrum if the feedback indicates a NACK.

In some aspects, the frames of the first set and the second set may use an alternating pattern. For example, a pattern may take the form shown in FIG. 4, FIG. 5, or take some other form.

In some aspects, a process based on the teachings herein may include any combination of the above operations and/or features.

Figure 7:
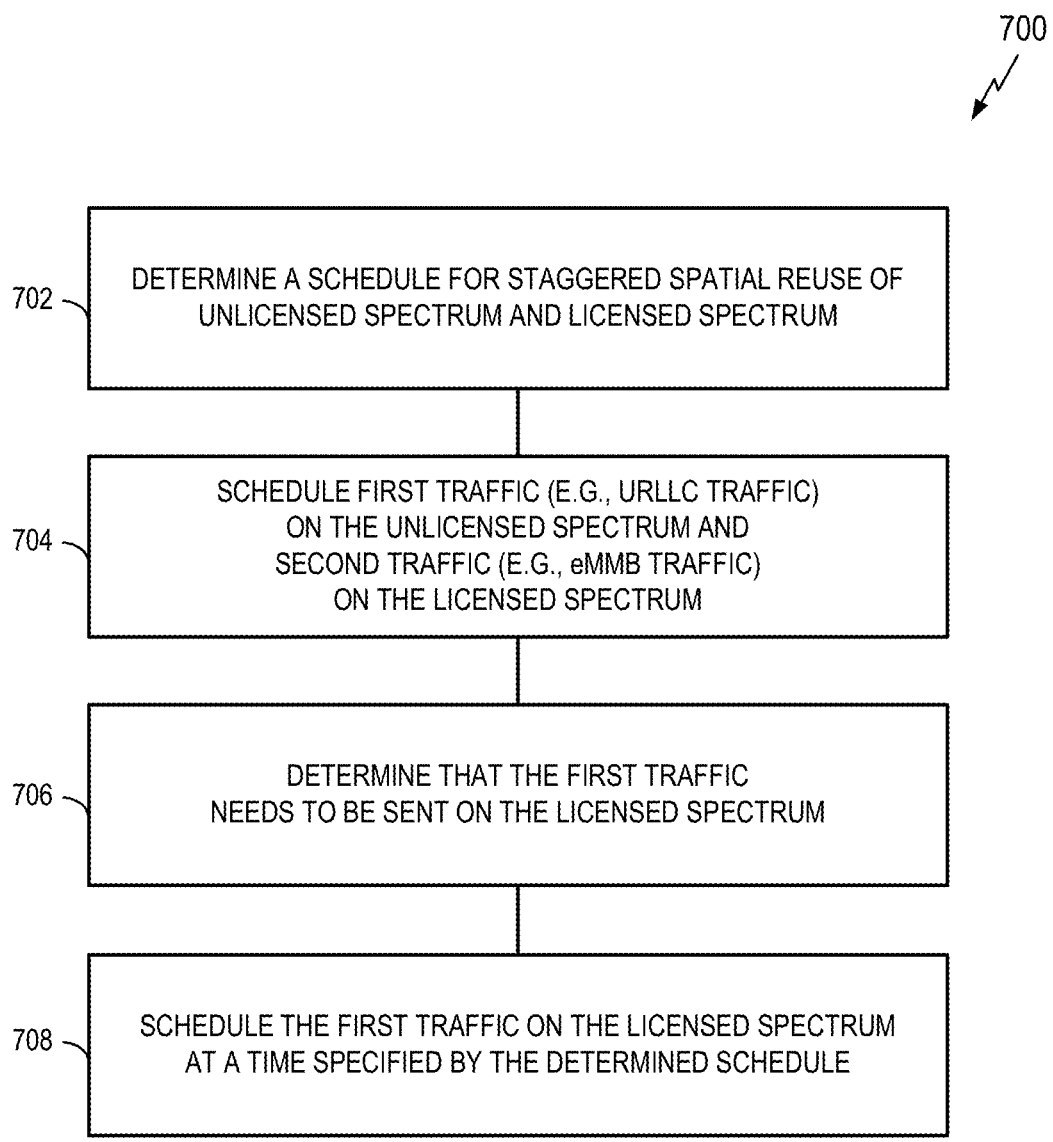
FIG. 7 is a flowchart illustrating an example of a scheduling process in accordance with some aspects of the disclosure.

FIG. 7 illustrates a scheduling process 700 in accordance with some aspects of the disclosure. The process 700 may take place within a processing circuit (e.g., the processing circuit 1010 of FIG. 10), which may be located in a master device, a controller, a UE, an access terminal, a gNB, a base station, or some other suitable apparatus. Of course, in various aspects within the scope of the disclosure, the process 700 may be implemented by any suitable apparatus capable of supporting communication-related operations (e.g., sidelink operations).

At block 702, an apparatus (e.g., a master device) determines a schedule for staggered spatial reuse of unlicensed spectrum and licensed spectrum.

At block 704, the apparatus schedules first traffic (e.g., URLLC traffic) on the unlicensed spectrum and second traffic (e.g., eMBB traffic) on the licensed spectrum.

At block 706, the apparatus determines that the first traffic needs to be sent on the licensed spectrum (e.g., due to the unlicensed spectrum being busy or associated with a high error rate).

At block 708, the apparatus schedules the first traffic on the licensed spectrum at a time specified by the determined schedule (e.g., the first traffic is sent during a later frame).

Figure 8:
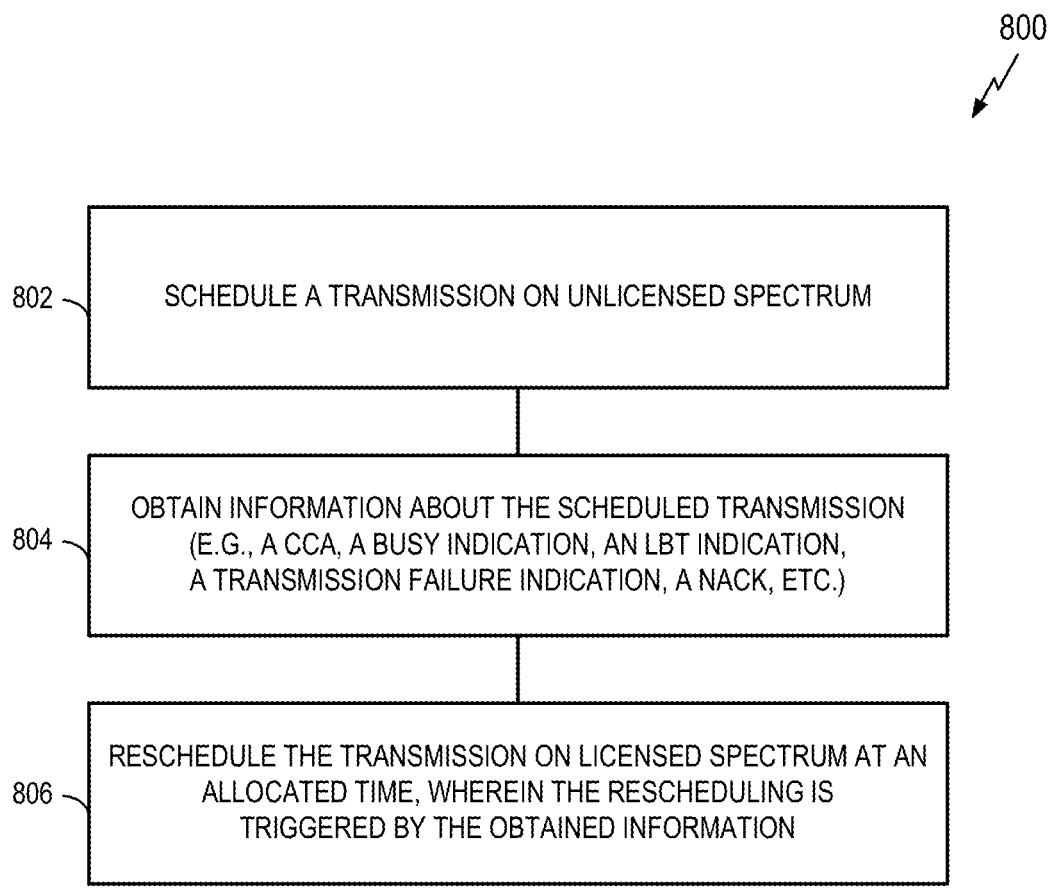
FIG. 8 is a flowchart illustrating another example of a scheduling process in accordance with some aspects of the disclosure.

FIG. 8 illustrates a scheduling process 800 in accordance with some aspects of the disclosure. The process 800 may take place within a processing circuit (e.g., the processing circuit 1010 of FIG. 10), which may be located in a master device, a controller, a UE, an access terminal, a gNB, a base station, or some other suitable apparatus. Of course, in various aspects within the scope of the disclosure, the process 800 may be implemented by any suitable apparatus capable of supporting communication-related operations (e.g., sidelink operations).

At block 802, an apparatus (e.g., a master device) schedules a transmission on unlicensed spectrum.

At block 804, the apparatus obtains information about the scheduled transmission (e.g., a CCA, a busy indication, an LBT indication, a transmission failure indication, a NACK, etc.).

At block 806, the apparatus reschedules the transmission on licensed spectrum at an allocated time, wherein the rescheduling is triggered by the obtained information.

Figure 9:
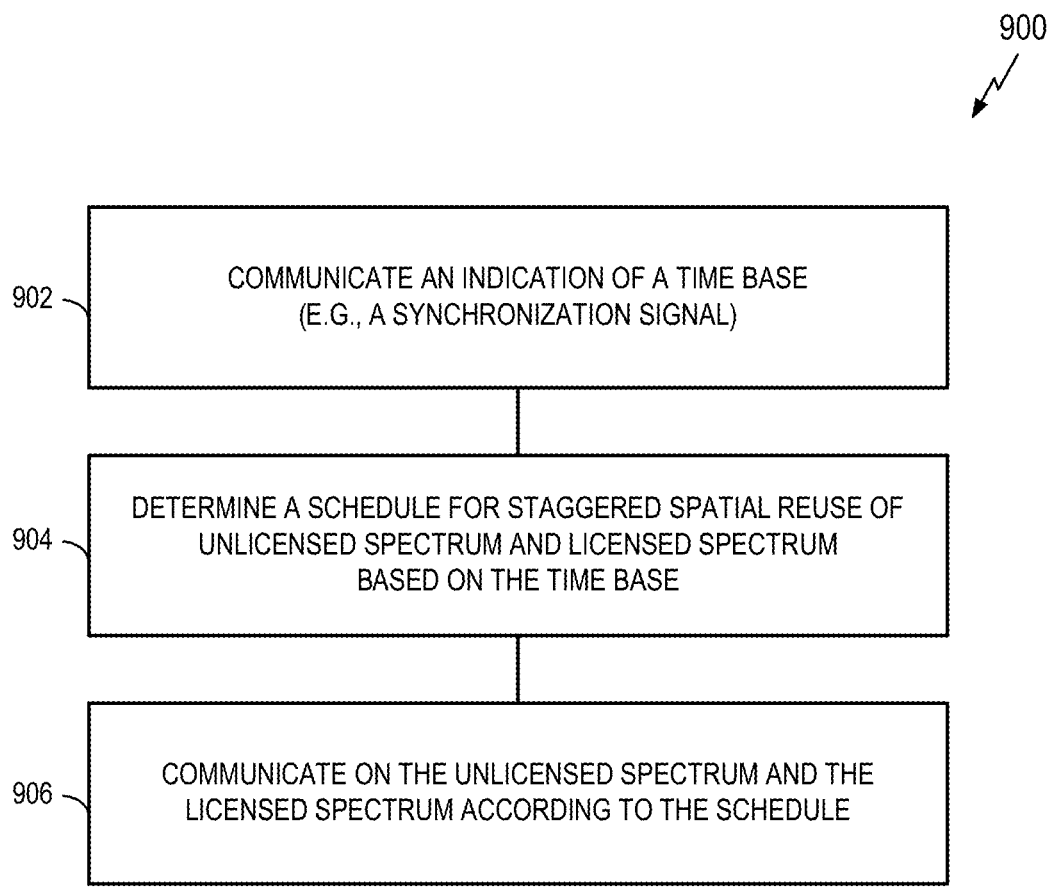
FIG. 9 is a flowchart illustrating an example of a synchronization process in accordance with some aspects of the disclosure.

FIG. 9 illustrates a synchronization process 900 in accordance with some aspects of the disclosure. The process 900 may take place within a processing circuit (e.g., the processing circuit 1010 of FIG. 10), which may be located in a master device, a controller, a UE, an access terminal, a gNB, a base station, or some other suitable apparatus. Of course, in various aspects within the scope of the disclosure, the process 900 may be implemented by any suitable apparatus capable of supporting communication-related operations (e.g., sidelink operations).

At block 902, an apparatus (e.g., a master device) communicates an indication of a time base (e.g., a synchronization signal).

At block 904, the apparatus determines a schedule for staggered spatial reuse of unlicensed spectrum and licensed spectrum, where the schedule is determined based on the time base. For example, frames of the schedule may be synchronized to the synchronization signal.

At block 906, the apparatus communicates on the unlicensed spectrum and the licensed spectrum according to the schedule.

First Example Apparatus

Figure 10:
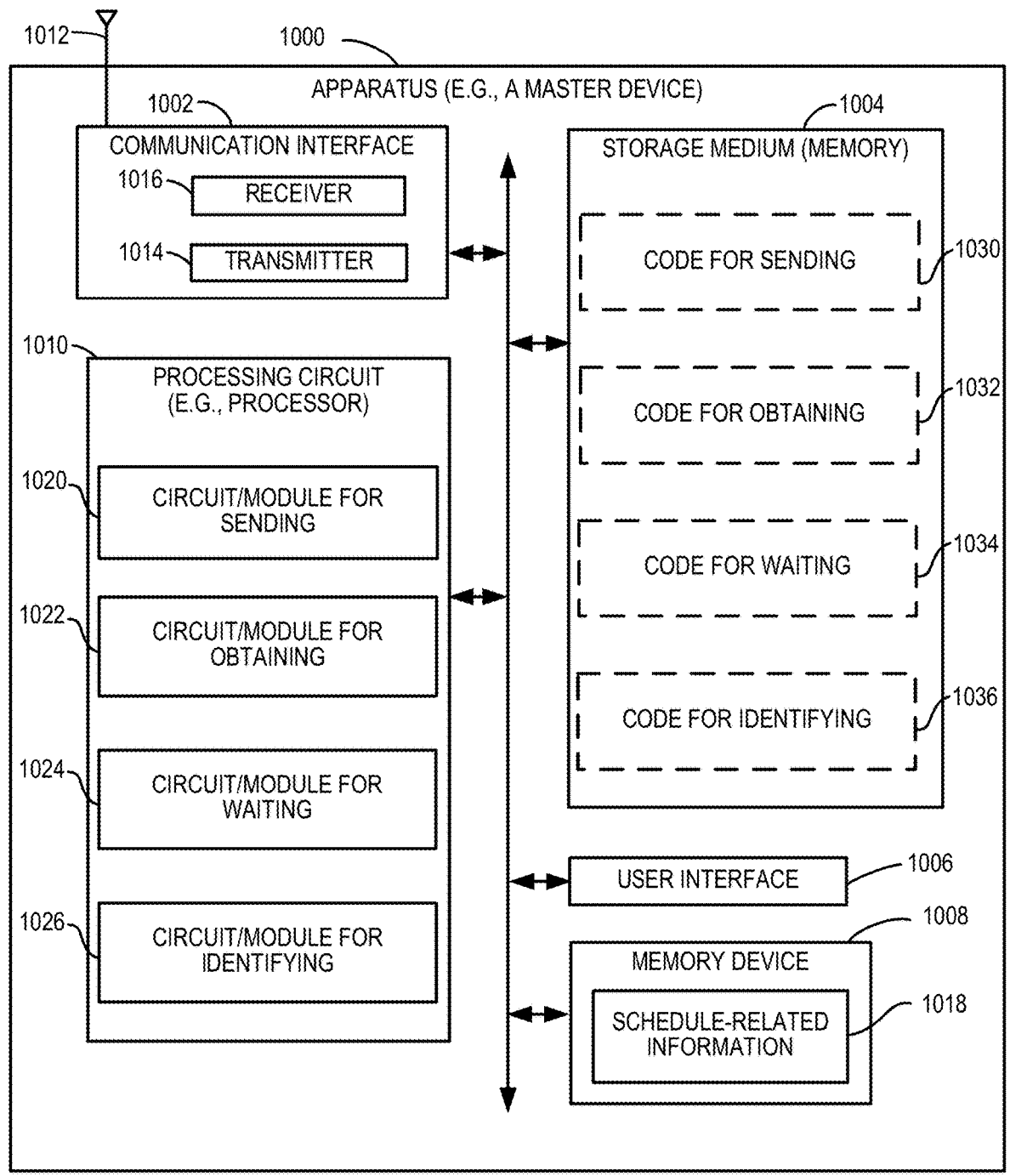
FIG. 10 is a block diagram illustrating an example hardware implementation for an apparatus (e.g., an electronic device) that can support communication in accordance with some aspects of the disclosure.

FIG. 10 illustrates a block diagram of an example hardware implementation of an apparatus 1000 configured to communicate (e.g., using synchronization and reuse) according to one or more aspects of the disclosure. The apparatus 1000 could embody or be implemented within a master device, a controller, a sensor device, an actuator device, a UE, a transmit receive point (TRP), an access point, or some other type of device that supports synchronization and reuse as taught herein. In various implementations, the apparatus 1000 could embody or be implemented within an access terminal, a base station, or some other type of device. In various implementations, the apparatus 1000 could embody or be implemented within a mobile phone, a smart phone, a tablet, a portable computer, a server, a network entity, a personal computer, a sensor, an alarm, a vehicle, a machine, an entertainment device, a medical device, or any other electronic device having circuitry.

The apparatus 1000 includes a communication interface 1002 (e.g., at least one transceiver), a storage medium 1004, a user interface 1006, a memory device 1008, and a processing circuit 1010 (e.g., at least one processor). These components can be coupled to and/or placed in electrical communication with one another via a signaling bus or other suitable component, represented generally by the connection lines in FIG. 10. The signaling bus may include any number of interconnecting buses and bridges depending on the specific application of the processing circuit 1010 and the overall design constraints. The signaling bus links together various circuits such that each of the communication interface 1002, the storage medium 1004, the user interface 1006, and the memory device 1008 are coupled to and/or in electrical communication with the processing circuit 1010. The signaling bus may also link various other circuits (not shown) such as timing sources, peripherals, voltage regulators, and power management circuits, which are well known in the art, and therefore, will not be described any further.

The communication interface 1002 may be adapted to facilitate wireless communication of the apparatus 1000. For example, the communication interface 1002 may include circuitry and/or programming adapted to facilitate the communication of information bi-directionally with respect to one or more communication devices in a network. Thus, in some implementations, the communication interface 1002 may be coupled to one or more antennas 1012 for wireless communication within a wireless communication system. In some implementations, the communication interface 1002 may be configured for wire-based communication. For example, the communication interface 1002 could be a bus interface, a send/receive interface, or some other type of signal interface including drivers, buffers, or other circuitry for outputting and/or obtaining signals (e.g., outputting signal from and/or receiving signals into an integrated circuit). The communication interface 1002 can be configured with one or more standalone receivers and/or transmitters, as well as one or more transceivers. In the illustrated example, the communication interface 1002 includes a transmitter 1014 and a receiver 1016.

The memory device 1008 may represent one or more memory devices. As indicated, the memory device 1008 may maintain schedule-related information 1018 along with other information used by the apparatus 1000. In some implementations, the memory device 1008 and the storage medium 1004 are implemented as a common memory component. The memory device 1008 may also be used for storing data that is manipulated by the processing circuit 1010 or some other component of the apparatus 1000.

The storage medium 1004 may represent one or more computer-readable, machine-readable, and/or processor-readable devices for storing programming, such as processor executable code or instructions (e.g., software, firmware), electronic data, databases, or other digital information. The storage medium 1004 may also be used for storing data that is manipulated by the processing circuit 1010 when executing programming. The storage medium 1004 may be any available media that can be accessed by a general purpose or special purpose processor, including portable or fixed storage devices, optical storage devices, and various other mediums capable of storing, containing or carrying programming.

By way of example and not limitation, the storage medium 1004 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1004 may be embodied in an article of manufacture (e.g., a computer program product). By way of example, a computer program product may include a computer-readable medium in packaging materials. In view of the above, in some implementations, the storage medium 1004 may be a non-transitory (e.g., tangible) storage medium.

The storage medium 1004 may be coupled to the processing circuit 1010 such that the processing circuit 1010 can read information from, and write information to, the storage medium 1004. That is, the storage medium 1004 can be coupled to the processing circuit 1010 so that the storage medium 1004 is at least accessible by the processing circuit 1010, including examples where at least one storage medium is integral to the processing circuit 1010 and/or examples where at least one storage medium is separate from the processing circuit 1010 (e.g., resident in the apparatus 1000, external to the apparatus 1000, distributed across multiple entities, etc.).

Programming stored by the storage medium 1004, when executed by the processing circuit 1010, causes the processing circuit 1010 to perform one or more of the various functions and/or process operations described herein. For example, the storage medium 1004 may include operations configured for regulating operations at one or more hardware blocks of the processing circuit 1010, as well as to utilize the communication interface 1002 for wireless communication utilizing their respective communication protocols. In some aspects, the storage medium 1004 may include a non-transitory computer-readable medium storing computer-executable code, including code to perform the functionality described herein.

The processing circuit 1010 is generally adapted for processing, including the execution of such programming stored on the storage medium 1004. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1010 is arranged to obtain, process and/or send data, control data access and storage, issue commands, and control other desired operations. The processing circuit 1010 may include circuitry configured to implement desired programming provided by appropriate media in at least one example. For example, the processing circuit 1010 may be implemented as one or more processors, one or more controllers, and/or other structure configured to execute executable programming Examples of the processing circuit 1010 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1010 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1010 are for illustration and other suitable configurations within the scope of the disclosure are also contemplated.

According to one or more aspects of the disclosure, the processing circuit 1010 may be adapted to perform any or all of the features, processes, functions, operations and/or routines for any or all of the apparatuses described herein. For example, the processing circuit 1010 may be configured to perform any of the steps, functions, and/or processes described with respect to FIGS. 1-9 and 11-13. As used herein, the term "adapted" in relation to the processing circuit 1010 may refer to the processing circuit 1010 being one or more of configured, used, implemented, and/or programmed to perform a particular process, function, operation and/or routine according to various features described herein.

The processing circuit 1010 may be a specialized processor, such as an application specific integrated circuit (ASIC) that serves as a means for (e.g., structure for) carrying out any one of the operations described in conjunction with FIGS. 1-9 and 11-13. The processing circuit 1010 may serve as one example of a means for transmitting and/or a means for receiving. In various implementations, the processing circuit 1010 may provide and/or incorporate, at least in part, the functionality described above for the first device 204 (e.g., the module for management of synchronized operations in licensed spectrum and unlicensed spectrum and associated reuse 226) of FIG. 2.

According to at least one example of the apparatus 1000, the processing circuit 1010 may include one or more of a circuit/module for sending 1020, a circuit/module for obtaining 1022, a circuit/module for waiting 1024, or a circuit/module for identifying 1026. In various implementations, the circuit/module for sending 1020, the circuit/module for obtaining 1022, the circuit/module for waiting 1024, or the circuit/module for identifying 1026 may provide and/or incorporate, at least in part, the functionality described above for the first device 204 (e.g., the module for management of synchronized operations in licensed spectrum and unlicensed spectrum and associated reuse 226) of FIG. 2.

As mentioned above, programming stored by the storage medium 1004, when executed by the processing circuit 1010, causes the processing circuit 1010 to perform one or more of the various functions and/or process operations described herein. For example, the programming may cause the processing circuit 1010 to perform the various functions, steps, and/or processes described herein with respect to FIGS. 1-9 and 11-13 in various implementations. As shown in FIG. 10, the storage medium 1004 may include one or more of code for sending 1030, code for obtaining 1032, code for waiting 1034, or code for identifying 1036. In various implementations, the code for sending 1030, the code for obtaining 1032, the code for waiting 1034, or the code for identifying 1036 may be executed or otherwise used to provide the functionality described herein for the circuit/module for sending 1020, the circuit/module for obtaining 1022, the circuit/module for waiting 1024, or the circuit/module for identifying 1026.

The circuit/module for sending 1020 may include circuitry and/or programming (e.g., code for sending 1030 stored on the storage medium 1004) adapted to perform several functions relating to, for example, sending (e.g., transmitting) information. In some implementations, the circuit/module for sending 1020 may obtain information (e.g., from the memory device 1008, or some other component of the apparatus 1000), process the information (e.g., encode the information for transmission), and send the information to another component (e.g., the transmitter 1014, the communication interface 1002, or some other component) that will transmit the information to another device. In some scenarios (e.g., if the circuit/module for sending 1020 includes a transmitter), the circuit/module for sending 1020 transmits the information directly to another device (e.g., the ultimate destination) via radio frequency signaling or some other type of signaling suitable for the applicable communication medium. For example, the circuit/module for sending may send information (e.g., data, an indication, etc.) on a first RF spectrum and/or send additional information (e.g., data, an indication, etc.) on a second RF spectrum.

The circuit/module for sending 1020 (e.g., a means for sending) may take various forms. In some aspects, the circuit/module for sending 1020 may correspond to, for example, an interface (e.g., a bus interface, a send/receive interface, or some other type of signal interface), a communication device, a transceiver, a transmitter, or some other similar component as discussed herein. In some implementations, the communication interface 1002 includes the circuit/module for sending 1020 and/or the code for sending 1030. In some implementations, the circuit/module for sending 1020 and/or the code for sending 1030 is configured to control the communication interface 1002 (e.g., a transceiver or a transmitter) to send information.

The circuit/module for obtaining 1022 may include circuitry and/or programming (e.g., code for obtaining 1032 stored on the storage medium 1004) adapted to perform several functions relating to, for example, obtaining information. In some scenarios, the circuit/module for obtaining 1032 may receive information (e.g., from the communication interface 1002, the memory device 1008, or some other component of the apparatus 1000) and process the information. The circuit/module for obtaining 1022 may then output the information or an indication based on the information to another component of the apparatus 1000 (e.g., the circuit/module for waiting 1024, the memory device 1008, or some other component). For example, in some implementations, the circuit/module for obtaining 1022 may obtain an indication that triggers a switch to another RF spectrum (e.g., RF band). In some implementations, the circuit/module for obtaining 1022 may obtain a synchronization signal. In some implementations, the circuit/module for obtaining 1022 may obtain an indication of a subset of frames to use and/or an indication of a subset of frames not to use.

The circuit/module for obtaining 1022 (e.g., a means for obtaining) may take various forms. In some aspects, the circuit/module for obtaining 1022 may correspond to, for example, a processing circuit as discussed herein. In some aspects, the circuit/module for obtaining 1022 may correspond to, for example, an interface (e.g., a bus interface, a receive interface, or some other type of signal interface), a communication device, a transceiver, a receiver, or some other similar component as discussed herein. In some implementations, the communication interface 1002 includes the circuit/module for obtaining 1022 and/or the code for obtaining 1032. In some implementations, the circuit/module for obtaining 1022 and/or the code for obtaining 1032 is configured to control the communication interface 1002 (e.g., a transceiver or a receiver) to communicate the information.

The circuit/module for waiting 1024 may include circuitry and/or programming (e.g., code for waiting 1034 stored on the storage medium 1004) adapted to perform several functions relating to, for example, waiting for a period of time. In some aspects, the circuit/module for waiting 1024 (e.g., a means for waiting) may correspond to, for example, a processing circuit.

In some implementations, the circuit/module for waiting 1024 receives an indication that the apparatus 1000 needs to switch to another RF spectrum (e.g., from memory device 1008, the circuit/module for obtaining 1022, or some other component). Upon receipt of that indication, the circuit/module for waiting 1024 may invoke a delay for a period of time (e.g., by providing a timer function). Following this delay, the circuit/module for waiting 1024 may output an indication that the allocated time has passed (e.g., to the memory device 1008, the circuit/module for sending 1024, or some other component).

The circuit/module for identifying 1026 may include circuitry and/or programming (e.g., code for identifying 1036 stored on the storage medium 1004) adapted to perform several functions relating to, for example identifying at least one frame to use (e.g., a subset of frames to use). In some aspects, the circuit/module for identifying 1026 (e.g., a means for identifying) may correspond to, for example, a processing circuit.

In some aspects, the circuit/module for identifying 1026 may identify a frame to use based on at least one criterion. For example, the circuit/module for identifying 1026 may schedule certain types of traffic on one type of RF spectrum and other types on another type of RF spectrum. In some aspects, the circuit/module for identifying 1026 may perform one or more of the operations described herein (e.g., in conjunction with FIGS. 1-9) to schedule traffic on RF spectrum. The circuit/module for identifying 1026 may then output an indication of the identified frame(s) (e.g., to the communication interface 1002, the memory device 1008, or some other component).

First Example Process

Figure 11:
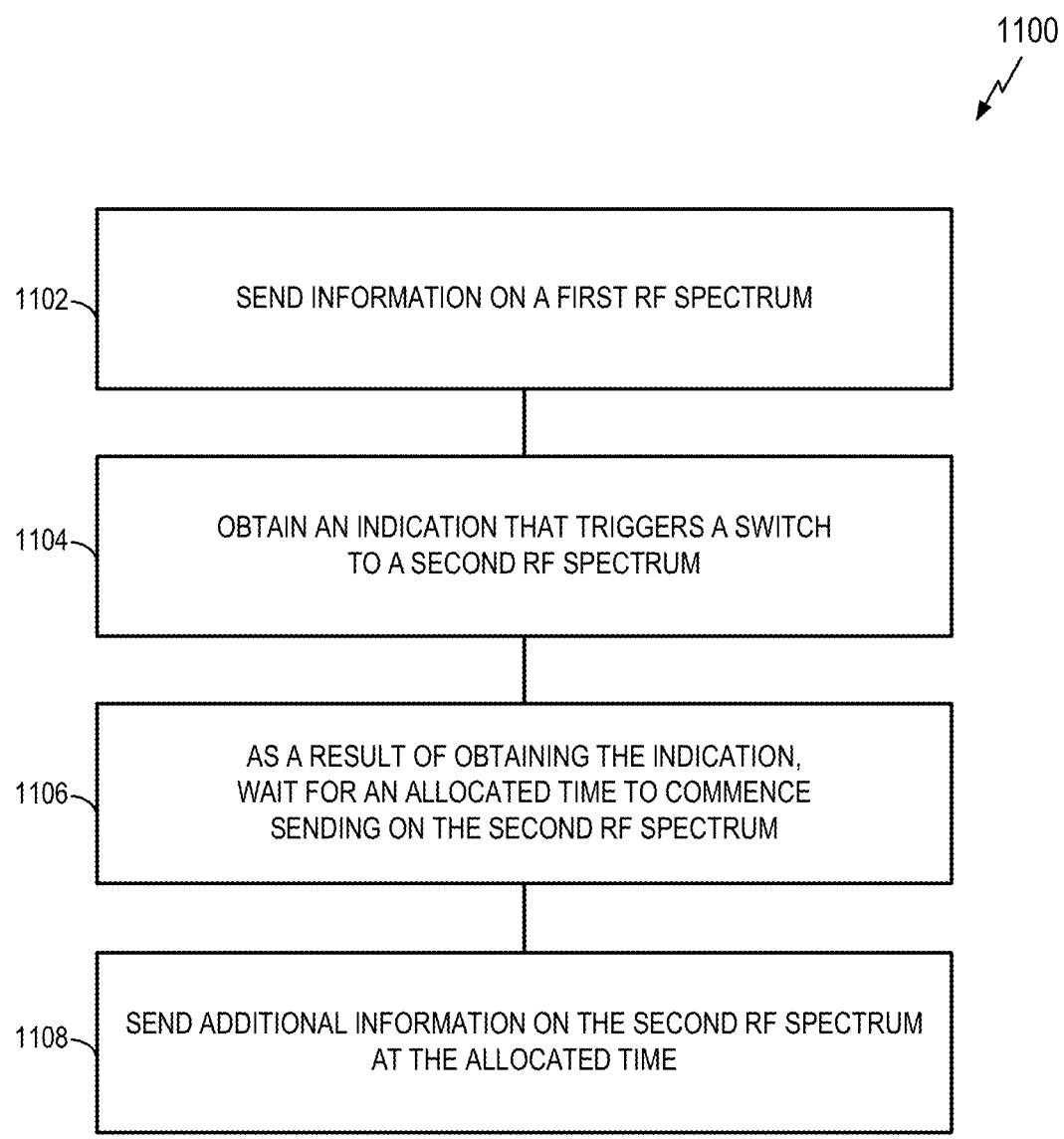
FIG. 11 is a flowchart illustrating an example of a communication process in accordance with some aspects of the disclosure.

FIG. 11 illustrates a process 1100 for communication in accordance with some aspects of the disclosure. The process 1100 may take place within a processing circuit (e.g., the processing circuit 1010 of FIG. 10), which may be located in a master device, a controller, a UE, an access terminal, a gNB, a base station, or some other suitable apparatus. Of course, in various aspects within the scope of the disclosure, the process 1100 may be implemented by any suitable apparatus capable of supporting communication-related operations (e.g., sidelink operations).

At block 1102, an apparatus (e.g., a master device) sends information on a first radio frequency (RF) spectrum. In some aspects, the first RF spectrum may be an unlicensed spectrum.

At block 1104, the apparatus obtains an indication that triggers a switch to a second RF spectrum. In some aspects, the second RF spectrum may be a licensed spectrum.

The indication that triggers a switch to the second RF spectrum may be obtained in various ways. For example, and without limitation, obtaining the indication may involve: retrieving the indication from a memory device, performing an operation that generates the indication, receiving the indication from another apparatus, obtaining the indication via a function call, receiving the indication in a message, or any combination thereof.

The indication that triggers a switch to the second RF spectrum may take different forms in different scenarios. For example, the indication that triggers a switch to the second RF spectrum may be based on: a clear channel assessment for the first RF spectrum, a channel busy indication for the first RF spectrum, a listen-before-talk indication for the first RF spectrum, a transmission failure for the information sent on the first RF spectrum, a negative acknowledgement, an evaluation of the information sent on the first RF spectrum, or any combination thereof.

At block 1106, as a result of obtaining the indication, the apparatus waits for an allocated time to commence sending on the second RF spectrum. For example, the apparatus may wait until an allocated resource on a licensed spectrum is available (e.g., wait for a particular frame or subframe). The allocation may be preconfigured (e.g., when the device is manufactured or initially configured, by a standard, or in some other manner) or dynamically configured (e.g., by a controller when the device is deployed in a particular system, in response to a request for an allocation, or in some other manner).

In some aspects, the allocated time may be specified by a frame structure. In some aspects, the frame structure may specify a reuse pattern. In some aspects, the frame structure may specify an alternating pattern for allocations on the first RF spectrum and the second RF spectrum. In some aspects, the frame structure may be based on a time base. In some aspects, the time base may include a synchronization signal and the process 1100 may further include obtaining (e.g., receiving) the synchronization signal.

At block 1108, the apparatus sends additional information on the second RF spectrum at the allocated time.

In some aspects, the process 1100 may further include obtaining an indication of a first subset of frames to use for operation on the first RF spectrum and a second subset of frames to use for operation on the second RF spectrum. In some aspects, the process 1100 may further include obtaining an indication of a first subset of frames to refrain from using (e.g., not to use) for operation on the first RF spectrum and a second subset of frames to refrain from using (e.g., not to use) for operation on the second RF spectrum. In some aspects, the process 1100 may further include identifying a first subset of frames to use for operation on the first RF spectrum and a second subset of frames to use for operation on the second RF spectrum; and sending an indication of the first subset of frames to use for operation on the first RF spectrum and the second subset of frames to use for operation on the second RF spectrum.

In some aspects, a process based on the teachings herein may include any combination of the above operations and/or features.

Second Example Process

Figure 12:
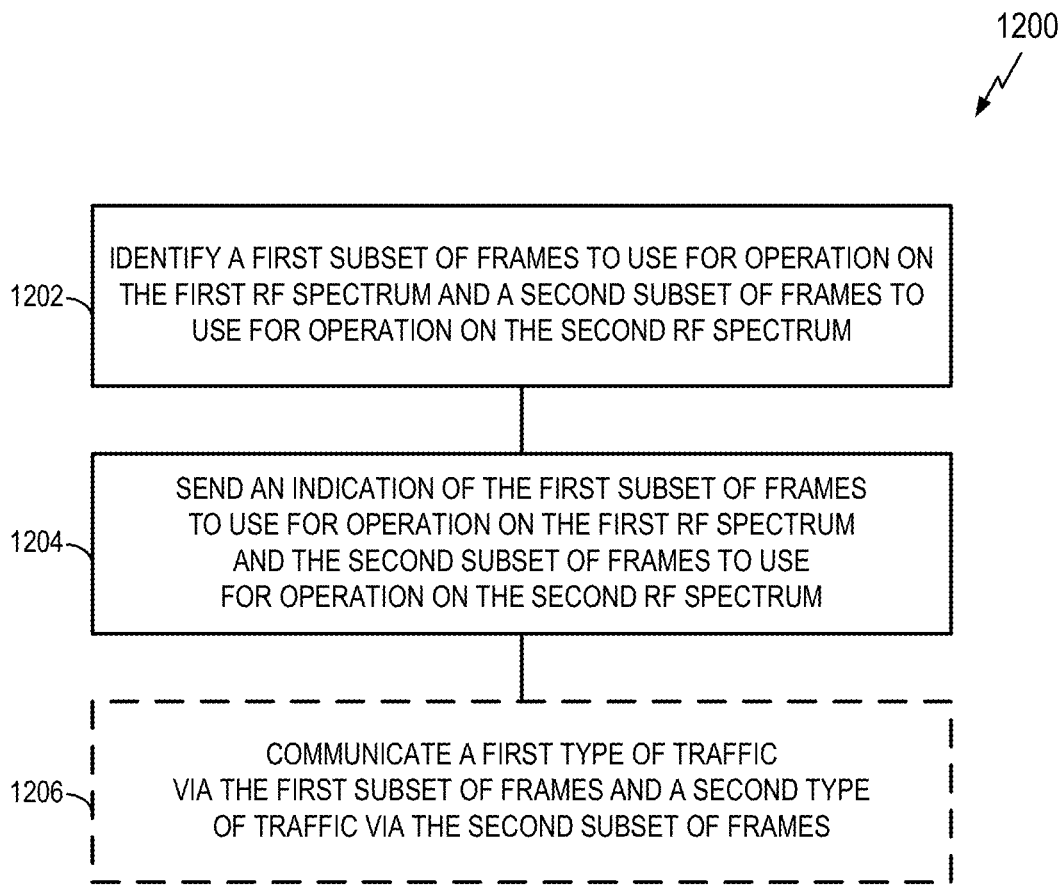
FIG. 12 is a flowchart illustrating another example of a scheduling process in accordance with some aspects of the disclosure.

FIG. 12 illustrates a process 1200 for communication in accordance with some aspects of the disclosure. One or more aspects of the process 1200 may be used in conjunction with (e.g., in addition to or as part of) the process 1100 of FIG. 11. The process 1200 may take place within a processing circuit (e.g., the processing circuit 1010 of FIG. 10), which may be located in a master device, a controller, a UE, an access terminal, a gNB, a base station, or some other suitable apparatus. Of course, in various aspects within the scope of the disclosure, the process 1200 may be implemented by any suitable apparatus capable of supporting communication-related operations (e.g., sidelink operations).

At block 1202, an apparatus (e.g., a master device) identifies a first subset of frames to use for operation on the first RF spectrum and a second subset of frames to use for operation on the second RF spectrum.

At block 1204, the apparatus sends an indication of the first subset of frames to use for operation on the first RF spectrum and the second subset of frames to use for operation on the second RF spectrum.

At optional block 1206, the apparatus may communicate (e.g., send and/or receive) a first type of traffic via the first subset of frames and a second type of traffic via the second subset of frames.

In some aspects, a process based on the teachings herein may include any combination of the above operations and/or features.

Third Example Process

Figure 13:
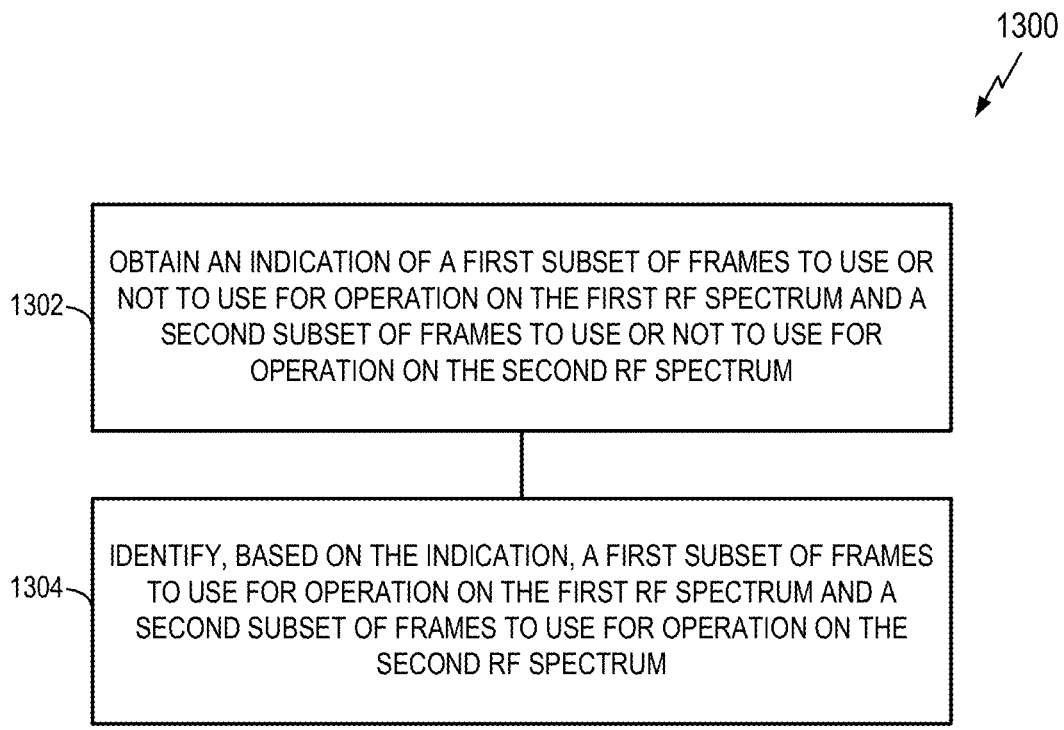
FIG. 13 is a flowchart illustrating another example of a scheduling process in accordance with some aspects of the disclosure.

FIG. 13 illustrates a process 1300 for communication in accordance with some aspects of the disclosure. One or more aspects of the process 1300 may be used in conjunction with (e.g., in addition to or as part of) the process 1100 of FIG. 11. The process 1300 may take place within a processing circuit (e.g., the processing circuit 1010 of FIG. 10), which may be located in a master device, a controller, a UE, an access terminal, a gNB, a base station, or some other suitable apparatus. Of course, in various aspects within the scope of the disclosure, the process 1300 may be implemented by any suitable apparatus capable of supporting communication-related operations (e.g., sidelink operations).

At block 1302, an apparatus (e.g., a master device) obtains an indication of a first subset of frames to use or not to use for operation on the first RF spectrum and a second subset of frames to use or not to use for operation on the second RF spectrum.

At block 1304, the apparatus identifies, based on the indication obtained at block 1302, a first subset of frames to use for operation on the first RF spectrum and a second subset of frames to use for operation on the second RF spectrum.

In some aspects, a process based on the teachings herein may include any combination of the above operations and/or features.

Second Example Apparatus

Figure 14:
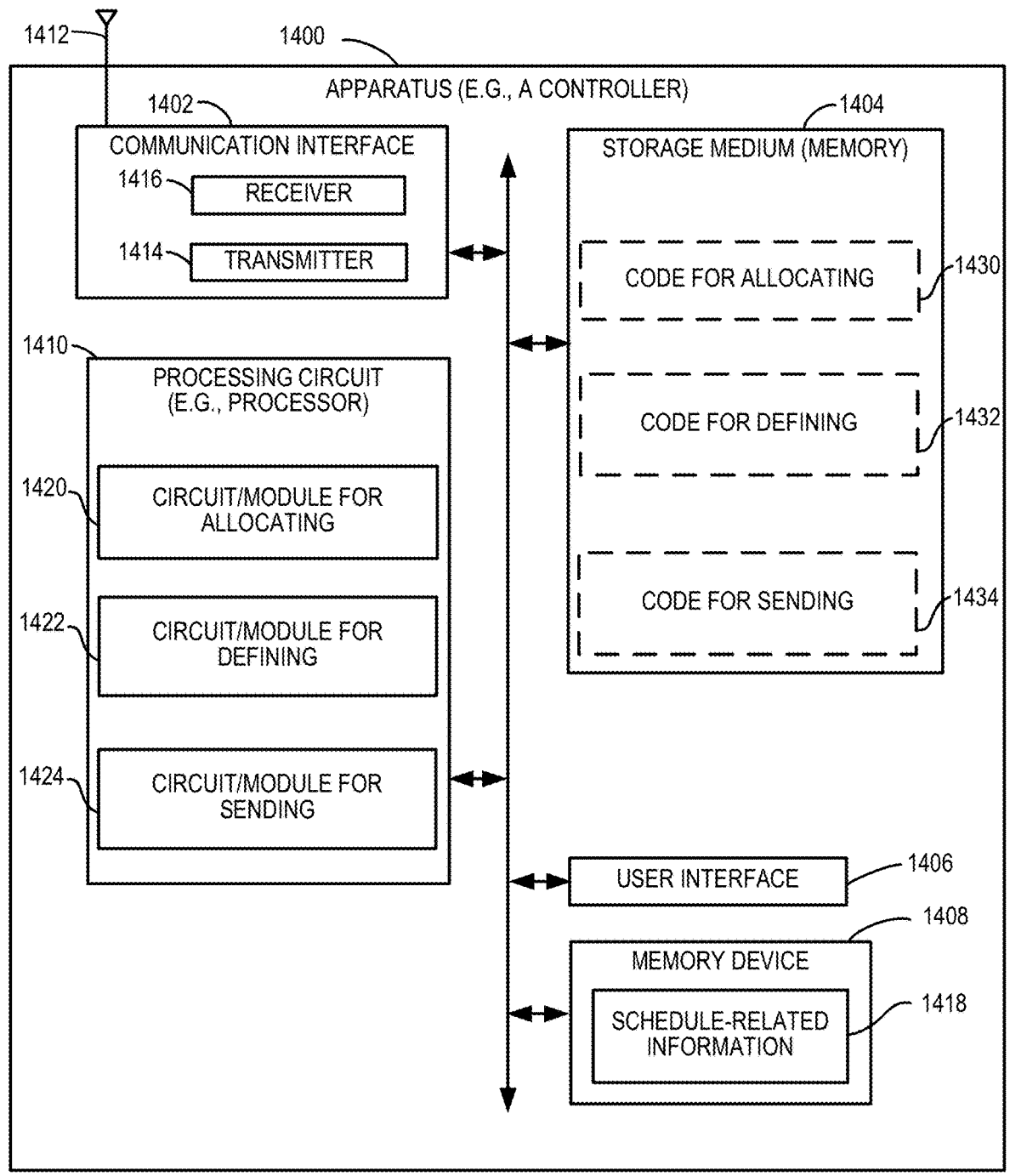
FIG. 14 is a block diagram illustrating another example hardware implementation for an apparatus (e.g., an electronic device) that can support communication in accordance with some aspects of the disclosure.

FIG. 14 illustrates a block diagram of an example hardware implementation of an apparatus 1400 configured to communicate (e.g., using synchronization and reuse) according to one or more aspects of the disclosure. The apparatus 1400 could embody or be implemented within a controller, a transmit receive point (TRP), an access point, a UE, or some other type of device that supports wireless communication (e.g., with synchronization and reuse) as taught herein. In various implementations, the apparatus 1400 could embody or be implemented within a base station, an access terminal, or some other type of device. In various implementations, the apparatus 1400 could embody or be implemented within a server, a network entity, a mobile phone, a smart phone, a tablet, a portable computer, a personal computer, a sensor, an alarm, a vehicle, a machine, an entertainment device, a medical device, or any other electronic device having circuitry.

The apparatus 1400 includes a communication interface 1402 (e.g., at least one transceiver), a storage medium 1404, a user interface 1406, a memory device 1408 (e.g., storing schedule-related information 1418), and a processing circuit 1410 (e.g., at least one processor). In various implementations, the user interface 1406 may include one or more of: a keypad, a display, a speaker, a microphone, a touchscreen display, of some other circuitry for receiving an input from or sending an output to a user. The communication interface 1402 may be coupled to one or more antennas 1412, and may include a transmitter 1414 and a receiver 1416. In general, the components of FIG. 14 may be similar to corresponding components of the apparatus 1000 of FIG. 10.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-9, 15, and 16. As used herein, the term "adapted" in relation to the processing circuit 1410 may refer to the processing circuit 1410 being one or more of configured, used, implemented, and/or programmed to perform a particular process, function, operation and/or routine according to various features described herein.

The processing circuit 1410 may be a specialized processor, such as an application specific integrated circuit (ASIC) that serves as a means for (e.g., structure for) carrying out any one of the operations described in conjunction with FIGS. 1-9, 15, and 16. The processing circuit 1410 may serve as one example of a means for transmitting and/or a means for receiving. In various implementations, the processing circuit 1410 may provide and/or incorporate, at least in part, the functionality described above for the controller 202 (e.g., the module for management of synchronized operations in licensed spectrum and unlicensed spectrum and associated reuse 218) of FIG. 2.

According to at least one example of the apparatus 1400, the processing circuit 1410 may include one or more of a circuit/module for allocating 1420, a circuit/module for defining 1422, or a circuit/module for sending 1424. In various implementations, the circuit/module for allocating 1420, the circuit/module for defining 1422, or the circuit/module for sending 1424 may provide and/or incorporate, at least in part, the functionality described above for the controller 202 (e.g., the module for management of synchronized operations in licensed spectrum and unlicensed spectrum and associated reuse 218) of FIG. 2.

As mentioned above, programming stored by the storage medium 1404, when executed by the processing circuit 1410, causes the processing circuit 1410 to perform one or more of the various functions and/or process operations described herein. For example, the programming may cause the processing circuit 1410 to perform the various functions, steps, and/or processes described herein with respect to FIGS. 1-9, 15, and 16 in various implementations. As shown in FIG. 14, the storage medium 1404 may include one or more of code for allocating 1430, code for defining 1432, or code for sending 1434. In various implementations, the code for allocating 1430, the code for defining 1432, or the code for sending 1434 may be executed or otherwise used to provide the functionality described herein for the circuit/module for allocating 1420, the circuit/module for defining 1422, or the circuit/module for sending 1424.

The circuit/module for allocating 1420 may include circuitry and/or programming (e.g., code for allocating 1430 stored on the storage medium 1404) adapted to perform several functions relating to, for example allocating devices to use at least one frame (e.g., a subset of frames) in at least one FR spectrum. In some aspects, the circuit/module for allocating 1420 (e.g., a means for allocating) may correspond to, for example, a processing circuit.

In some aspects, the circuit/module for allocating 1420 may identify a frame and/or RF spectrum to use based on at least one criterion. For example, the circuit/module for allocating 1420 may schedule certain types of traffic on one type of RF spectrum and other types on another type of RF spectrum. As another example, the circuit/module for allocating 1420 may schedule certain types of traffic on a certain number of frames and other types on another number of frames. In some aspects, the circuit/module for allocating 1420 may perform one or more of the operations described herein (e.g., in conjunction with FIGS. 1-9) to schedule traffic on RF spectrum. The circuit/module for allocating 1420 may then output an indication of the identified frame(s) and RF spectrum (e.g., to the communication interface 1402, the memory device 1408, or some other component).

The circuit/module for defining 1422 may include circuitry and/or programming (e.g., code for defining 1432 stored on the storage medium 1404) adapted to perform several functions relating to, for example, defining at least one frame structure. In some aspects, the circuit/module for defining 1422 (e.g., a means for defining) may correspond to, for example, a processing circuit.

In some aspects, the circuit/module for defining 1422 may obtain information about an allocation for at least one set of devices (e.g., from the circuit/module for allocating 1420, the memory device 1408, or some other component) and generate a schedule based on the allocation (e.g., as in FIG. 4 or 5). The circuit/module for defining 1422 may then output an indication of the frame structure (e.g., to the circuit/module for sending 1422, the memory device 1408, or some other component).

The circuit/module for sending 1424 may include circuitry and/or programming (e.g., code for sending 1434 stored on the storage medium 1404) adapted to perform several functions relating to, for example, sending (e.g., transmitting) information. In some implementations, the circuit/module for sending 1424 may obtain information (e.g., from the memory device 1408, or some other component of the apparatus 1400), process the information (e.g., encode the information for transmission), and send the information to another component (e.g., the transmitter 1414, the communication interface 1402, or some other component) that will transmit the information to another device. In some scenarios (e.g., if the circuit/module for sending 1424 includes a transmitter), the circuit/module for sending 1424 transmits the information directly to another device (e.g., the ultimate destination) via radio frequency signaling or some other type of signaling suitable for the applicable communication medium. For example, the circuit/module for sending may send information (e.g., data, an indication, etc.) on a first RF spectrum and/or send additional information (e.g., data, an indication, etc.) on a second RF spectrum.

The circuit/module for sending 1424 (e.g., a means for sending) may take various forms. In some aspects, the circuit/module for sending 1424 may correspond to, for example, an interface (e.g., a bus interface, a send/receive interface, or some other type of signal interface), a communication device, a transceiver, a transmitter, or some other similar component as discussed herein. In some implementations, the communication interface 1402 includes the circuit/module for sending 1424 and/or the code for sending 1434. In some implementations, the circuit/module for sending 1424 and/or the code for sending 1434 is configured to control the communication interface 1402 (e.g., a transceiver or a transmitter) to send information.

Fourth Example Process

Figure 15:
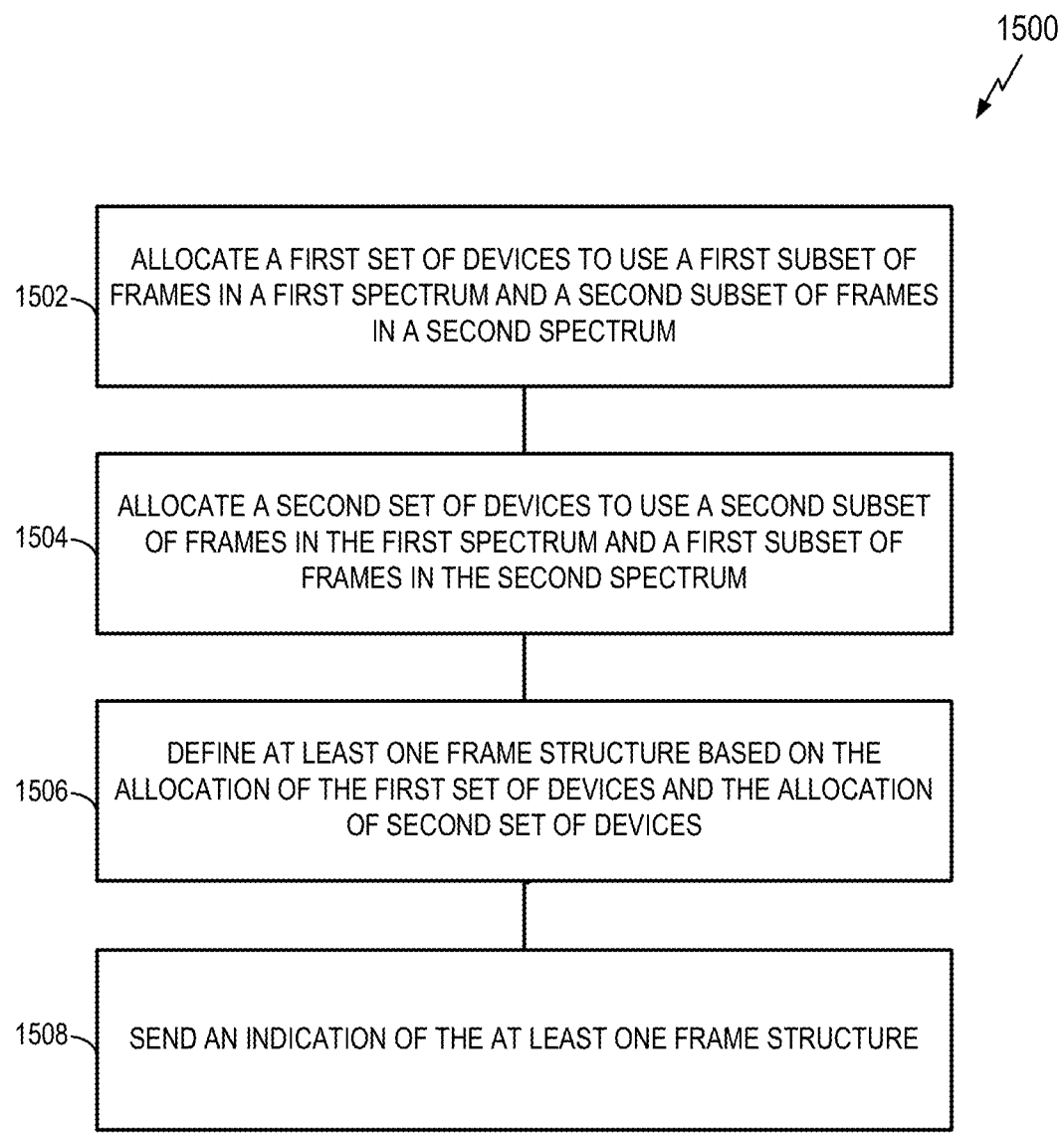
FIG. 15 is a flowchart illustrating another example of a communication process in accordance with some aspects of the disclosure.

FIG. 15 illustrates a process 1500 for communication in accordance with some aspects of the disclosure. The process 1500 may take place within a processing circuit (e.g., the processing circuit 1410 of FIG. 14), which may be located in a controller, a gNB, a base station, a UE, an access terminal, or some other suitable apparatus. Of course, in various aspects within the scope of the disclosure, the process 1500 may be implemented by any suitable apparatus capable of supporting communication-related operations.

At block 1502, an apparatus (e.g., a controller) allocates a first set of devices to use a first subset of frames in a first RF spectrum and a second subset of frames in a second RF spectrum. In some aspects, the first RF spectrum may be an unlicensed spectrum and the second RF spectrum may be a licensed spectrum.

At block 1504, the apparatus allocates a second set of devices to use a second subset of frames in the first RF spectrum and a first subset of frames in the second RF spectrum.

At block 1506, the apparatus defines at least one frame structure based on the allocation of the first set of devices and the allocation of second set of devices. In some aspects, the at least one frame structure may be based on a time base. In some aspects, the time base may include a synchronization signal. In some aspects, the at least one frame structure may specify a reuse pattern for the first RF spectrum and the second RF spectrum.

At block 1508, the apparatus sends an indication of the at least one frame structure. In some aspects, the process 1500 may further include sending the synchronization signal to the first set of devices and the second set of devices.

In some aspects, a process based on the teachings herein may include any combination of the above operations and/or features.

Fifth Example Process

Figure 16:
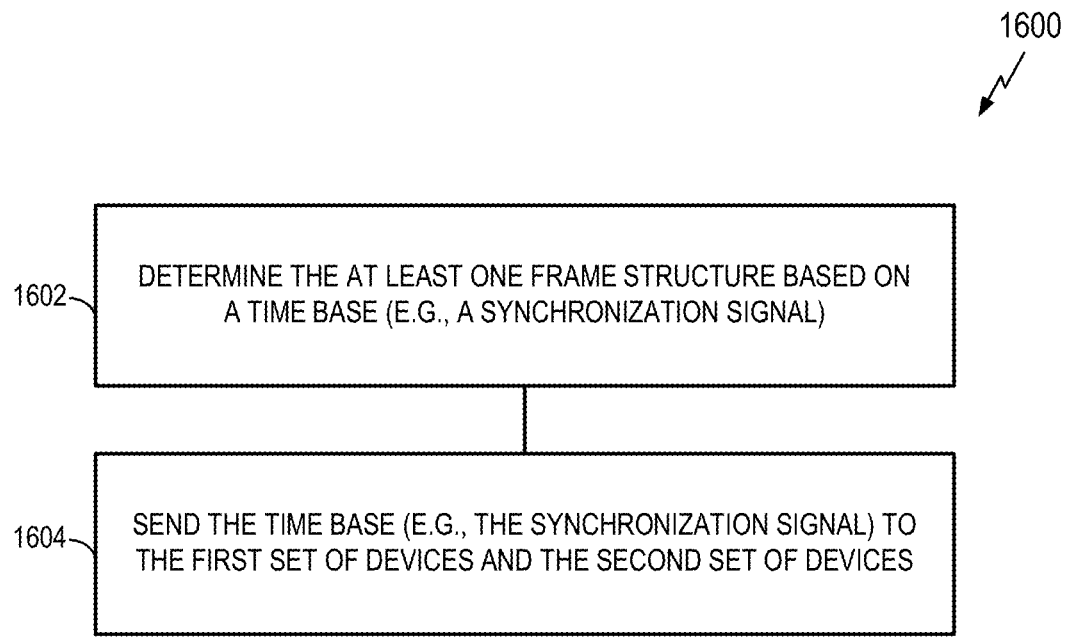
FIG. 16 is a flowchart illustrating an example of a synchronization process in accordance with some aspects of the disclosure.

FIG. 16 illustrates a process 1600 for communication in accordance with some aspects of the disclosure. One or more aspects of the process 1600 may be used in conjunction with (e.g., in addition to or as part of) the process 1500 of FIG. 15. The process 1600 may take place within a processing circuit (e.g., the processing circuit 1410 of FIG. 14), which may be located in a controller, a gNB, a base station, a UE, an access terminal, or some other suitable apparatus. Of course, in various aspects within the scope of the disclosure, the process 1600 may be implemented by any suitable apparatus capable of supporting communication-related operations.

At block 1602, an apparatus (e.g., a controller) determines the at least one frame structure based on a time base (e.g., a synchronization signal).

At block 1604, the apparatus sends the time base (e.g., the synchronization signal) to the first set of devices and the second set of devices.

In some aspects, a process based on the teachings herein may include any combination of the above operations and/or features.

Additional Aspects

The disclosure relates in some aspects to a method of communication for an apparatus. The method includes: allocating a first set of devices to use a first subset of frames in a first radio frequency (RF) spectrum and a second subset of frames in a second RF spectrum; allocating a second set of devices to use a second subset of frames in the first RF spectrum and a first subset of frames in the second RF spectrum; defining at least one frame structure based on the allocation of the first set of devices and the allocation of the second set of devices; and sending an indication of the at least one frame structure. In some aspects, the first RF spectrum may be an unlicensed spectrum; and the second RF spectrum may be a licensed spectrum. In some aspects, the at least one frame structure may be based on a time base. In some aspects, the time base may include (e.g., may be) a synchronization signal. In some aspects, the method may further include sending the synchronization signal to the first set of devices and the second set of devices. In some aspects, the at least one frame structure may specify a reuse pattern for the first RF spectrum and the second RF spectrum.

The disclosure relates in some aspects to an apparatus for communication that includes a memory and a processor coupled to the memory. The processor and the memory are configured to: allocate a first set of devices to use a first subset of frames in a first radio frequency (RF) spectrum and a second subset of frames in a second RF spectrum; allocate a second set of devices to use a second subset of frames in the first RF spectrum and a first subset of frames in the second RF spectrum; define at least one frame structure based on the allocation of the first set of devices and the allocation of the second set of devices; and send an indication of the at least one frame structure. In some aspects, the first RF spectrum may be an unlicensed spectrum; and the second RF spectrum may be a licensed spectrum. In some aspects, the at least one frame structure may be based on a time base. In some aspects, the time base may include (e.g., may be) a synchronization signal. In some aspects, the processor and the memory may be further configured to: send the synchronization signal to the first set of devices and the second set of devices. In some aspects, the at least one frame structure may specify a reuse pattern for the first RF spectrum and the second RF spectrum.

The disclosure relates in some aspects to an apparatus for communication. The apparatus includes: means for allocating a first set of devices to use a first subset of frames in a first radio frequency (RF) spectrum and a second subset of frames in a second RF spectrum; means for allocating a second set of devices to use a second subset of frames in the first RF spectrum and a first subset of frames in the second RF spectrum; means for defining at least one frame structure based on the allocation of the first set of devices and the allocation of the second set of devices; and means for sending an indication of the at least one frame structure. In some aspects, the first RF spectrum may be an unlicensed spectrum; and the second RF spectrum may be a licensed spectrum. In some aspects, the at least one frame structure may be based on a time base. In some aspects, the time base may include (e.g., may be) a synchronization signal. In some aspects, the means for sending may be configured to send the synchronization signal to the first set of devices and the second set of devices. In some aspects, the at least one frame structure may specify a reuse pattern for the first RF spectrum and the second RF spectrum.

The disclosure relates in some aspects to a non-transitory computer-readable medium. The medium stores computer-executable code, including code to: allocate a first set of devices to use a first subset of frames in a first RF spectrum and a second subset of frames in a second RF spectrum; allocate a second set of devices to use a second subset of frames in the first RF spectrum and a first subset of frames in the second RF spectrum; define at least one frame structure based on the allocation of the first set of devices and the allocation of the second set of devices; and send an indication of the at least one frame structure.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to 3GPP 5G systems and/or other suitable systems, including those described by yet-to-be defined wide area network standards. Various aspects may also be applied to systems using LTE (in FDD, TDD, or both modes), LTE-Advanced (LTE-A) (in FDD, TDD, or both modes), Universal Mobile Telecommunications System (UMTS), Global System for Mobile Communications (GSM), Code Division Multiple Access (CDMA), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Various aspects may also be applied to UMTS systems such as W-CDMA, TD-SCDMA, and TD-CDMA. The actual telecommunication standard, network architecture, and/or communication standard used will depend on the specific application and the overall design constraints imposed on the system.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects.

Likewise, the term "aspect" does not require that all aspects include the discussed feature, advantage or mode of operation. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication for an apparatus, comprising:
   sending first information on a first radio frequency (RF) spectrum, wherein the first RF spectrum is an unlicensed spectrum;
   obtaining an indication that triggers a switch to a second RF spectrum, wherein the second RF spectrum is a licensed spectrum;
   as a result of obtaining the indication, waiting for an allocated time to commence sending on the second RF spectrum;
   sending second information on the second RF spectrum at the allocated time; and
   performing a clear channel assessment on the first RF spectrum a specified time after the second information is sent on the second RF spectrum.

2. The method of claim 1, wherein the indication that triggers a switch to the second RF spectrum is based on: a clear channel assessment for the first RF spectrum, a channel busy indication for the first RF spectrum, a listen-before-talk indication for the first RF spectrum, or any combination thereof.

3. The method of claim 1, wherein the indication that triggers a switch to the second RF spectrum is based on: a transmission failure for the first information sent on the first RF spectrum, a negative acknowledgement, an evaluation of the first information sent on the first RF spectrum, or any combination thereof.

4. The method of claim 1, wherein the allocated time is specified by a frame structure that defines a first set of frames for the first RF spectrum and the second set of frames for the second RF spectrum.

5. The method of claim 4, wherein the frame structure specifies a reuse pattern.

6. The method of claim 4, wherein the frame structure specifies an alternating pattern for allocations on the first RF spectrum and the second RF spectrum.

7. The method of claim 4, wherein the frame structure is based on a time base.

8. The method of claim 7, wherein:
   the time base comprises a synchronization signal; and
   the method further comprises obtaining the synchronization signal.

9. The method of claim 1, further comprising:
   obtaining an indication of a first subset of frames to use for operation on the first RF spectrum and a second subset of frames to use for operation on the second RF spectrum.

10. The method of claim 1, further comprising:
    obtaining an indication of a first subset of frames not to use for operation on the first RF spectrum and a second subset of frames not to use for operation on the second RF spectrum.

11. The method of claim 1, further comprising:
    identifying a first subset of frames to use for operation on the first RF spectrum and a second subset of frames to use for operation on the second RF spectrum; and
    sending an indication of the first subset of frames to use for operation on the first RF spectrum and the second subset of frames to use for operation on the second RF spectrum.

12. The method of claim 1, wherein the second frame immediately follows the first frame.

13. An apparatus for communication comprising:
    a memory; and
    a processor coupled to the memory, the processor and the memory configured to:
send first information on a first radio frequency (RF) spectrum, wherein the first RF spectrum is an unlicensed spectrum;
obtain an indication that triggers a switch to a second RF spectrum, wherein the second RF spectrum is a licensed spectrum;
as a result of obtaining the indication, wait for an allocated time to commence sending on the second RF spectrum;
send second information on the second RF spectrum at the allocated time; and
perform a clear channel assessment on the first RF spectrum a specified time after the second information is sent on the second RF spectrum.

14. The apparatus of claim 13, wherein the indication that triggers a switch to the second RF spectrum is based on: a clear channel assessment for the first RF spectrum, a channel busy indication for the first RF spectrum, a listen-before-talk indication for the first RF spectrum, or any combination thereof.

15. The apparatus of claim 13, wherein the indication that triggers a switch to the second RF spectrum is based on: a transmission failure for the first information sent on the first RF spectrum, a negative acknowledgement, an evaluation of the first information sent on the first RF spectrum, or any combination thereof.

16. The apparatus of claim 13, wherein the allocated time is specified by a frame structure that defines a first set of frames for the first RF spectrum and the second set of frames for the second RF spectrum.

17. The apparatus of claim 16, wherein the frame structure specifies a reuse pattern.

18. The apparatus of claim 16, wherein the frame structure specifies an alternating pattern for allocations on the first RF spectrum and the second RF spectrum.

19. The apparatus of claim 16, wherein the frame structure is based on a time base.

20. The apparatus of claim 19, wherein:
the time base comprises a synchronization signal; and
the processor and the memory are further configured to obtain the synchronization signal.

21. The apparatus of claim 13, wherein the processor and the memory are further configured to:
obtain an indication of a first subset of frames to use for operation on the first RF spectrum and a second subset of frames to use for operation on the second RF spectrum.

22. The apparatus of claim 13, wherein the processor and the memory are further configured to:
obtain an indication of a first subset of frames not to use for operation on the first RF spectrum and a second subset of frames not to use for operation on the second RF spectrum.

23. The apparatus of claim 13, wherein the processor and the memory are further configured to:
identify a first subset of frames to use for operation on the first RF spectrum and a second subset of frames to use for operation on the second RF spectrum; and
send an indication of the first subset of frames to use for operation on the first RF spectrum and the second subset of frames to use for operation on the second RF spectrum.

24. An apparatus for communication, comprising:
means for sending first information on a first radio frequency (RF) spectrum, wherein the first RF spectrum is an unlicensed spectrum;
means for obtaining an indication that triggers a switch to a second RF spectrum, wherein the second RF spectrum is a licensed spectrum;
means for, as a result of obtaining the indication, waiting for an allocated time to commence sending on the second RF spectrum,
wherein the means for sending is further configured to send second information on the second RF spectrum at the allocated time; and
means for performing a clear channel assessment on the first RF spectrum a specified time after the second information is sent on the second RF spectrum.

25. The apparatus of claim 24, wherein the indication that triggers a switch to the second RF spectrum is based on: a clear channel assessment for the first RF spectrum, a channel busy indication for the first RF spectrum, a listen-before-talk indication for the first RF spectrum, or any combination thereof.

26. The apparatus of claim 24, wherein the indication that triggers a switch to the second RF spectrum is based on: a transmission failure for the first information sent on the first RF spectrum, a negative acknowledgement, an evaluation of the first information sent on the first RF spectrum, or any combination thereof.

27. The apparatus of claim 24, wherein the allocated time is specified by a frame structure that defines a first set of frames for the first RF spectrum and the second set of frames for the second RF spectrum.

28. A non-transitory computer-readable medium storing computer-executable code, including code to:
send first information on a first radio frequency (RF) spectrum, wherein the first RF spectrum is an unlicensed spectrum;
obtain an indication that triggers a switch to a second RF spectrum, wherein the second RF spectrum is a licensed spectrum;
as a result of obtaining the indication, wait for an allocated time to commence sending on the second RF spectrum;
send second information on the second RF spectrum at the allocated time; and
perform a clear channel assessment on the first RF spectrum at a specified time after the second information is sent on the second RF spectrum.

* * * * *